(12) United States Patent
Kasatani

(10) Patent No.: US 7,577,662 B2
(45) Date of Patent: Aug. 18, 2009

(54) NETWORK COMMUNICATION SYSTEM AND NETWORK MULTIFUNCTION PRODUCT

(75) Inventor: Kiyoshi Kasatani, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 373 days.

(21) Appl. No.: 11/065,256

(22) Filed: Feb. 25, 2005

(65) Prior Publication Data

US 2005/0219640 A1    Oct. 6, 2005

(30) Foreign Application Priority Data

Feb. 25, 2004    (JP)    ............... 2004-049182

(51) Int. Cl.
*G06F 7/00* (2006.01)
(52) U.S. Cl. .................. 707/10; 709/203
(58) Field of Classification Search ............ 707/1–10, 707/200–204; 709/203, 219, 217
See application file for complete search history.

(56) References Cited

U.S. PATENT DOCUMENTS

| | | | | |
|---|---|---|---|---|
| 6,041,123 A * | 3/2000 | Colvin, Sr. | ............... | 713/153 |
| 6,047,327 A * | 4/2000 | Tso et al. | ............... | 709/232 |
| 6,959,122 B2 * | 10/2005 | McIntyre | ............... | 382/305 |
| 7,047,212 B1 * | 5/2006 | Pych et al. | ............... | 705/26 |
| 7,284,040 B2 * | 10/2007 | Kobayashi et al. | ............... | 709/219 |
| 2001/0032251 A1 * | 10/2001 | Rhoads et al. | ............... | 709/217 |
| 2001/0054106 A1 * | 12/2001 | Anderson et al. | ............... | 709/227 |
| 2002/0038363 A1 * | 3/2002 | MacLean | ............... | 709/224 |
| 2002/0174206 A1 * | 11/2002 | Moyer et al. | ............... | 709/221 |
| 2002/0178164 A1 * | 11/2002 | Wisniewski | ............... | 707/10 |
| 2003/0063770 A1 * | 4/2003 | Svendsen et al. | ............... | 382/100 |
| 2003/0078963 A1 * | 4/2003 | Parry | ............... | 709/203 |
| 2004/0085578 A1 * | 5/2004 | Quek et al. | ............... | 358/1.18 |
| 2004/0101156 A1 * | 5/2004 | Kacker | ............... | 382/100 |
| 2004/0186894 A1 * | 9/2004 | Jhingan et al. | ............... | 709/207 |

FOREIGN PATENT DOCUMENTS

| | | |
|---|---|---|
| JP | 9-284448 | 10/1997 |
| JP | 2000-216944 | 8/2000 |
| JP | 2002-56008 | 2/2002 |
| JP | 2003-131921 | 5/2003 |
| JP | 2003-196241 | 7/2003 |
| JP | 2004-153518 | 5/2004 |
| WO | WO 03/081441 | 10/2003 |

* cited by examiner

*Primary Examiner*—Wilson Lee
(74) *Attorney, Agent, or Firm*—Oblon, Spivak, McClelland, Maier & Neustadt, P.C.

(57) ABSTRACT

In a network communication system, data is exchanged between a source computer and a destination computer via a file server. The source computer is a network multifunction product and includes an uploading unit that uploads a file to the file server; and a URI sending unit that sends a Universal Resource Identifier (URI) of the file to the destination computer by e-mail. The destination computer is also a network multifunction product and includes a table that holds security information that is required to access to the file; a URI receiving unit that receives the URI; and a downloading unit that downloads the file from the file server using the security information that corresponds to the URI.

15 Claims, 48 Drawing Sheets

(PERSONAL SETTING)

(PERSONAL INFORMATION)

FIG.8A

E-MAIL ADDRESS (100 ITEMS)

FACSIMILE ADDRESS (100 ITEMS)

GROUP ADDRESS (100 ITEMS)

FILE ADDRESS (100 ITEMS)

SUBJECT/TEXT (100 ITEMS)

DOCUMENT NAME/USER NAME (100 ITEMS)

(REGISTRATION INFORMATION)

(E-MAIL ADDRESS: FOR ONE ITEM)

(FACSIMILE ADDRESS: FOR ONE ITEM)

(GROUP ADDRESS: FOR ONE ITEM)

FIG. 8E

| NAME |
|---|
| NETWORK PATH |
| LOGIN USER NAME |
| LOGIN PASSWORD |
| SUBFOLDER NAME |
| COMMUNICATION OPTION |
| FTP JAPANESE MODE |
| FTP DATA TRANSFER MODE |
| SPECIFY OCR ADDRESS |

(FILE ADDRESS: FOR ONE ITEM)

FIG.9A

| SERVER TYPE | NETWORK PATH |
|---|---|
| WINDOWS FILE SERVER | "¥¥<host>¥<path>"<br>"file://[<user>:<password>@]<host>/<path>" |
| FTP SERVER | "ftp://[<user>:<password>@]<host>[:<port>]/<path>" |
| WEBDAV SERVER | "http(s)://[<user>:<password>@]<host>[:<port>]/<path>" |
| EXTERNAL DOCUMENT MANAGEMENT SERVER | BY SPECIFICATION OF EXTERNAL SERVER PLUG-IN |

(NETWORK PATH AT FILE ADDRESS)

FIG.9B

| LOCAL MEDIA TYPE | ABBREVIATION | LOCAL PATH |
|---|---|---|
| COMPACT FLASH | cf | "file:///cf:<path>" |
| SMART MEDIA | Sm | "file:///sm:<path>" |
| SD MEMORY CARD | Sd | "file:///sd:<path>" |
| MEMORY STICK | Ms | "file:///ms:<path>" |
| DVD/CD-ROM | Cd | "file:///cd:<path>" |

(LOCAL PATH AT FILE ADDRESS)

(SUBJECT/TEXT: FOR ONE ITEM)

(DOCUMENT NAME/USER NAME: FOR ONE ITEM)

FIG.10A

| READ CONDITIONS (12) |
| IMAGE PROCESSING CONDITIONS (12) |
| TRANSMISSION/STORAGE CONDITION ONE-TOUCH (20) |
| PRINT CONDITION ONE-TOUCH (20) |
| INCOMING MAILBOX (12) |
| SHARED MEDIA ADDRESSES (12) |
| FILE TRANSMISSION LINK ADDRESSES (12) |

(PRESET INFORMATION)

(READ CONDITIONS)

(IMAGE PROCESSING CONDITIONS: CONTINUED)

(IMAGE PROCESSING CONDITIONS: CONTINUATION)

(TRANSMISSION/STORAGE CONDITION ONE-TOUCH:CONTINUED)

(TRANSMISSION/STORAGE CONDITION ONE-TOUCH: CONTINUATION)

FIG. 13

| NAME |
|---|
| CHARACTER SIZE |
| ICON |
| DISPLAY/NON-DISPLAY |
| PRINT FORMAT |
| COLOR FORMAT |
| PRIORITY |
| TWO-SIDED PRINTING |
| SORT/STACK |
| PUNCH |
| STAPLE |
| PAPER SIZE |
| PAPER TYPE |
| IMAGE PROCESSING CONDITIONS |
| PRINT FORM |
| FILE NAME |
| FILE DATE |
| PERSONAL NAME |

(PRINT CONDITION ONE-TOUCH)

(INCOMING MAILBOX)

(INITIAL VALUE OF ACCOUNT NAME)

(INITIAL VALUE OF ACCOUNT NAME)

(SHARED MEDIA ADDRESS)

(FILE TRANSMISSION LINK ADDRESS)

(PERSONAL SYSTEM SETTING INFORMATION)

FIG.15B

| |
|---|
| AUTMATIC CLOSE OF PERSONAL MENU (ONLY FOR PERSON) |
| AUTO-CLEAR TIME (ONLY FOR GUEST) |
| RETURN TO MAIN SCREEN AFTER FINISHING OPERATION |
| KEY INPUT/SCREEN TOUCH SOUND SETTING |
| AUTOMATIC INPUT OF E-MAIL SUBJECT |
| AUTOMATIC INPUT OF E-MAIL TEXT |
| TEXT FILE FORMAT |
| COMPRESSION SETTING AT CONVERSION TO TIFF IMAGE |
| COMPRESSION SETTING AT CONVERSION TO JPEG IMAGE |
| MAXIMUM NUMBER OF COLORS AT CONVERSION TO PNG IMAGE |

(STANDARD SETTING)

(READ SETTING)

(COMMUNICATION SETTING)

(PRINT SETTING)

FIG. 18B

| DIRECTION OF OCR RECOGNITION |
|---|
| LANGUAGE FOR OCR RECOGNITION |
| DOCUMENT FOR OCR RECOGNITION |
| LARGEST CHARACTER SIZE FOR OCR RECOGNITION |

(OCR SETTING)

(SECURITY)

(RESTRICTION OF NETWORK ACCESS)

(SENDER AUTHENTICATION)

(ACCESS RIGHT SETTING)

(SYSTEM SETTING INFORMATION)

FIG.20B

- HOST NAME
- DOMAIN NAME
- IP ADDRESS
- SUBNET MASK
- GATEWAY ADDRESS
- DNS SERVER ADDRESS 1
- DNS SERVER ADDRESS 2
- PROXY SERVER SETTING
  - PROXY SERVER ADDRESS
  - PROXY SERVER PORT NUMBER
  - PROXY UNUSED ADDRESS
  - USER NAME
  - PASSWORD
- SSL ENCRYPTION
  - ISO COUNTRY CODE
  - PREFECTURE NAME
  - CITY, WARD, TOWN AND VILLAGE (NETWORK SETTING, CONTINUED)

FIG.20C

| COMPANY NAME/ORGANIZATION NAME |
| --- |
| POST NAME/ORGANIZATION NAME, SECTION NAME |
| SERVER NAME |
| ADMINISTRATOR'S E-MAIL ADDRESS |
| EXPIRATION DATE |
| PORT NUMBER SETTING |
| SMTP TRANSMISSION |
| SMTP RECEPTION |
| POP |
| FTP |
| HTTP |
| HTTPS |
| LDAP |
| IP ADDRESS OF PRINTER |
| LAN SPEED |
| PHYSICAL ADDRESS (MAC) |

(NETWORK SETTING, CONTINUATION)

FIG.21A

| IP ADDRESS OF SMTP SERVER |
| --- |
| E-MAIL RECEIVING PROTOCOL |
| POP E-MAIL ADDRESS |
| POP SERVER ADDRESS |
| POP ACCOUNT NAME |
| POP PASSWORD |
| POP E-MAIL RECEPTION INTERVAL |
| DEFAULT DESTINATION OF POP E-MAIL |
| USAGE OF PUBLIC ADDRESS BOOK |
| LDAP SERVER ADDRESS 1 |
| IDENTIFICATION NAME |
| LDAP SERVER ADDRESS 2 |
| IDENTIFICATION NAME |
| AUTOMATIC UPDATE OF PUBLIC ADDRESS BOOK |
| SENDER AUTHENTICATION |
| AUTHENTICATION PROTOCOL |
| ADDRESS OF POP SERVER FOR AUTHENTICATION |
| USER NAME FOR AUTHENTICATION |
| PASSWORD FOR AUTHENTICATION |

(E-MAIL SETTING, CONTINUED)

FIG.21B

| RESTRICTION OF TRANSMISSION SIZE |
| MAXIMUM SIZE |
| SPLIT E-MAIL |
| TRANSMISSION INTERVAL |
| RETRANSMISSION INTERVAL |
| NUMBER OF RETRANSMISSION |

(E-MAIL SETTING, CONTINUATION)

(FACSIMILE SETTING)

(FILE TRANSFER SETTING)

(SYSTEM CONTROL)

(STORED DOCUMENT)

(HISTORY CONTROL)

(SECURITY)

(DATE SETTING)

(CONFIDENTIAL LINK INFORMATION TABLE)

(CONFIDENTIAL LINK INFORMATION)

FIG.26A

STORED DOCUMENT
PLEASE SELECT DOCUMENT.

| SELECT FOLDER | UP-WARD | DOCUMENT NAME: DOCUMENT 1 | TO TRANS-MISSION/STORAGE |
|---|---|---|---|

DOCUMENT NAME: DOCUMENT 1

(THUMBNAIL IMAGE)

TO PRINT SCREEN

DISPLAY ALL DOCUMENTS

SEARCH

1/2

▲ TO PREVIOUS PAGE

▼ TO SUBSEQUENT PAGE

FIG.26B

TRANSMISSION IS READY.
PLEASE SPECIFY DESTINATION, AND PRESS START KEY.

SPECIFY DESTINATION
PLEASE PRESS [ADD DESTINATION] IF THERE IS ANOTHER DESTINATION, OR [OK] IF NOT.

CANCEL    OK

>> ADD DESTINATION    TO: PLANNING DEPARTMENT 〈creator@cr.****jp〉

To:   Cc:   Bcc:   NUMBER OF DESTINATION: 1/1    CLEAR

E-MAIL ADDRESS | FACSIMILE ADDRESS | GROUP ADDRESS | DIRECT INPUT

| NAME | E-MAIL ADDRESS | SECTION |
|---|---|---|
| SERVICE DEPARTMENT | service@sa.****.jp | SALES DIVISION |
| PLANNING DEPARTMENT | creator@cr.****.jp | PLANNING DEPARTMENT |
| user1 | user1@kb.****.jp | SUPPORT DEPARTMENT |
| user2 | user2@cr.****.jp | PLANNING DEPARTMENT |

DISPLAY ALL

SEARCH

1/2

▲ TO PREVIOUS PAGE

▼ TO SUBSEQUENT PAGE

FIG.27A

TRANSMISSION IS READY.
PLEASE SPECIFY DESTINATION, AND PRESS START KEY.

REPLY ADDRESS SPECIFICATION
SPECIFY REPLY ADDRESS                                     [CANCEL] [OK]

SERVICE DEPARTMENT <service@sa.****.jp>

[CLEAR]

PERSONAL REPLY ADDRESS | [FACSIMILE ADDRESS] [GROUP ADDRESS] | [DIRECT INPUT]

| NAME | E-MAIL ADDRESS | SECTION | DISPLAY ALL |
|---|---|---|---|
| SERVICE DEPARTMENT | service@sa.****.jp | SALES DIVISION | SEARCH |
| PLANNING DEPARTMENT | creator@cr.****.jp | PLANNING DEPARTMENT | ▲TO PREVIOUS PAGE |
| USER1 | user1@kb.****.jp | SUPPORT DEPARTMENT | ▼TO SUBSEQUENT PAGE |
| USER2 | user2@cr.****.jp | PLANNING DEPARTMENT | |

FIG.27B

TRANSMISSION IS READY.
PLEASE SPECIFY DESTINATION, AND PRESS START KEY.

SUBJECT SPECIFICATION
SPECIFY SUBJECT                                           [CANCEL] [OK]

REQUEST

[CLEAR]

PERSONAL REPLY ADDRESS | REGISTERED SUBJECT DIRECT INPUT

| 001 | MINUTES WILL BE SENT | 006 | CATALOG DATA |
|---|---|---|---|
| 002 | REQUEST | 007 | *UNREGISTERED |
| 003 | CIRCULAR | 008 | *UNREGISTERED |
| 004 | URGENT! | 009 | *UNREGISTERED |
| 005 | DATA WILL BE SENT | 010 | *UNREGISTERED |

▲TO PREVIOUS PAGE
▼TO SUBSEQUENT PAGE

FIG.29A

```
TRANSMISSION OPTION                                    [CANCEL]  [OK]
PLEASE SELECT TRANSMISSION FORMAT.
* COMMON SETTING IS USED FOR E-MAIL TRANSMISSION
AND FILE TRANSMISSION.
```

| ■ FILE FORMAT | NO CHANGE | IMAGE FILE | IMAGE PDF | IMAGE PDF+OCR |
|---|---|---|---|---|
| ■ LINK TRANSMISSION | YES | NO | | |
| ■ LINK FORMAT | DOCUMENT STORAGE LINK | TRANSMISSION LINK | | |
| ■ FILE TRANSMISSION LINK ADDRESS | NO SPECIFICATION | | CHANGE | |
| ■ THUMBNAIL TRANSMISSION | YES | NO | | |
| ■ COMPRESSION OF FILES | YES | NO | | |

FIG.29B

```
FILE TRANSMISSION LINK ADDRESS                         [CANCEL]  [OK]
PLEASE SELECT PREFERENTIAL FILE
TRANSMISSION LINK ADDRESS, AND PRESS [OK].
```

| DISCLOSED IMAGE FILE | INFORMATION DISCLOSURE | *UN-REGISTERED | *UN-REGISTERED |
|---|---|---|---|
| *UN-REGISTERED | *UN-REGISTERED | *UN-REGISTERED | *UN-REGISTERED |
| *UN-REGISTERED | *UN-REGISTERED | *UN-REGISTERED | *UN-REGISTERED |

FIG.30

| TRANSMISSION OPTION | | | | CANCEL | OK |
|---|---|---|---|---|---|
| PLEASE SELECT TRANSMISSION FORMAT.<br>* COMMON SETTING IS USED FOR E-MAIL<br>  TRANSMISSION AND FILE TRANSMISSION. | | | | | |
| ■FILE FORMAT | NO CHANGE | IMAGE FILE | IMAGE PDF | IMAGE PDF+OCR | |
| ■LINK TRANSMISSION | YES | NO | | | |
| ■LINK FORMAT | DOCUMENT STORAGE LINK | FILE TRANSMISSION LINK | | | |
| ■ FILE TRANSMISSION LINK ADDRESS | INFORMATION DISCLOSURE | | | CHANGE | |
| ■THUMBNAIL TRANSMISSION | YES | NO | | | |
| ■COMPRESSION OF FILES | YES | NO | | | |

NETWORK COMMUNICATION SYSTEM AND NETWORK MULTIFUNCTION PRODUCT

CROSS-REFERENCE TO RELATED APPLICATIONS

The present document incorporates by reference the entire contents of Japanese priority document, 2004-49182 filed in Japan on Feb. 25, 2004.

BACKGROUND OF THE INVENTION

1) Field of the Invention

The present invention relates to a network communication system in which data is exchanged among a plurality of computers via a file server.

2) Description of the Related Art

Network communication systems are known that include a network multifunction product, which can send/receive various kinds of data to/from other devices using a plurality of protocols.

Various kinds of services that use a network multifunction product as a core are provided in these network communication systems. There are, for example, a "scan to e-mail" service in which an image scanned from a document is transmitted to a specified e-mail address by e-mail, a printout service in which text of a received e-mail and images attached thereto are recorded and output, and a transfer service in which the text and the images are transmitted to a specified facsimile machine. One example of conventional art is disclosed in Japanese Patent Application Laid-Open No. H9-284448.

In such a network communication system, it is desired that a file to be transmitted from the network multifunction product is delivered to the other devices by means of various kinds of communication tools and protocols.

SUMMARY OF THE INVENTION

It is an object of the present invention to at least solve the problems in the conventional technology.

A network communication system according to an aspect of the present invention includes a file server, a source computer, and a destination computer. The source computer is a network multifunction product, and includes an uploading unit that uploads a file to the file server; and a URI sending unit that sends a Universal Resource Identifier (URI) of the file to the destination computer by e-mail.

A network multifunction product according to another aspect of the present invention includes an uploading unit that uploads a file to the file server; and a URI sending unit that sends a Universal Resource Identifier (URI) of the file to a destination computer by e-mail.

The other objects, features, and advantages of the present invention are specifically set forth in or will become apparent from the following detailed description of the invention when read in conjunction with the accompanying drawings.

BRIEF DESCRIPTION OF THE DRAWINGS

FIGS. 8A to 8E are schematic diagrams of one example of registration information, e-mail destination, facsimile address, group address, and file address;

FIGS. 9A to 9D are schematic diagrams of one example of a network path and a local path of the file address, subject/text, and document name/user;

FIGS. 10A to 10B are schematic diagrams of one example of preset information and read conditions;

FIG. 13 is a schematic diagram of one example of print condition one-touch;

FIGS. 15A to 15B are schematic diagrams of one example of personal system setting information and standard setting;

FIGS. 18A to 18B are schematic diagrams of one example of print setting and optical character reader (OCR) setting;

FIGS. 20A to 20C are schematic diagrams of one example of system setting and network setting;

FIGS. 21A to 21B are schematic diagrams of one example of e-mail setting;

FIGS. 26A to 26B are schematic diagrams of one example of stored document screen and address specifying screen;

FIGS. 27A to 27B are schematic diagrams of one example of reply address specifying screen and subject specifying screen;

FIGS. 29A to 29B are schematic diagrams of one example of transmission option selecting screen and file transmission link address selecting screen;

FIG. 30 is a schematic diagram of one example of transmission option selecting screen after having set respective items.

DETAILED DESCRIPTION

An exemplary embodiment of the present invention will be explained below. In the explanation below, when words, phrases, or abbreviations expressing goods, a specific image data format, or the like are included, these words, phrases, or abbreviations can be registered trademarks or trademarks of respective manufacturers, organizations, or individuals. These registered trademarks or trademarks are ones used generally or idiomatically in the technical field to which the present invention is applied, and hence explanatory notes therefor may be omitted.

In the embodiment, an example in which the present invention is applied to a so-called digital color multifunction product formed by combining functions of a copy function, a FAX function, a print function, a scanner function, and a function of distributing an input image (a read document image by the scanner function, or an image input by a printer or the FAX function) is shown.

Figure 1:
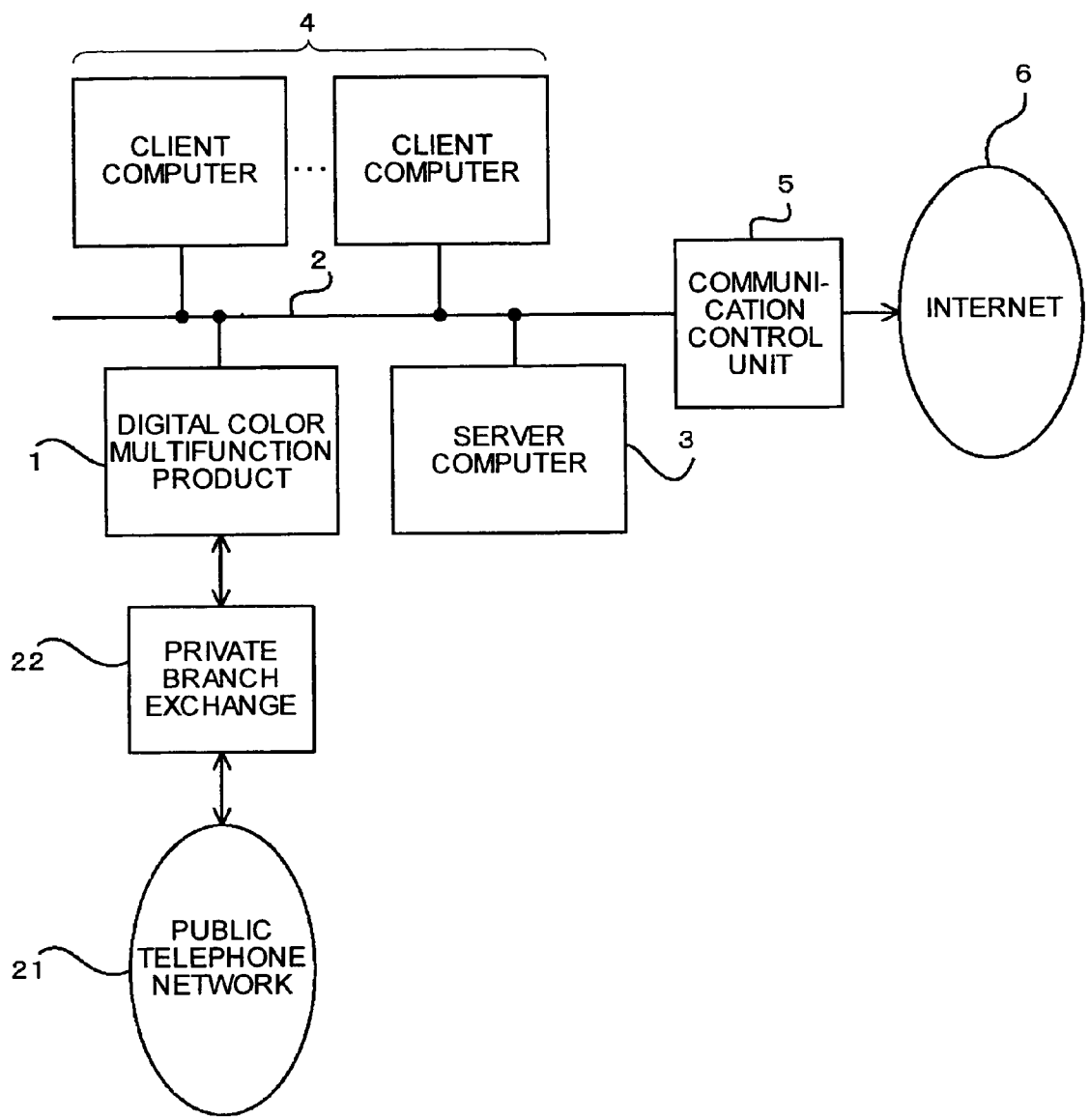
FIG. 1 is a system block diagram including a digital color multifunction product according to one embodiment of the present invention.

FIG. 1 is a system block diagram including a digital color multifunction product 1 according to the embodiment.

As shown in FIG. 1, in the embodiment, a system is assumed in which a server computer 3 that executes various kinds of information processing and a plurality of client computers 4 are connected to the digital color multifunction product 1, which is an information processing system, via a local area network (LAN) 2 as a communication network. The server computer 3 is for supporting, for example, file transfer protocol (FTP) and hypertext transfer protocol (HTTP), and realizing the function of a Web server and a domain name service (DNS) server.

In other words, this system builds an environment such that an image input function (scanner function), an image output function (print function), and an image processing function such as image storing function included in the digital color multifunction product 1 can be shared on the local area network 2.

This system is constructed such that the system is connected to the Internet 6 via a communication control unit 5, and can communicate data with the external environment via the Internet 6.

As the communication control unit 5, a router, a switchboard, a modem, or a digital subscriber line (DSL) modem is generally used, but it is only necessary as a minimum requirement for the communication control unit 5 that Transmission Control Protocol/Internet Protocol (TCP/IP) communications are possible. The local area network 2 is not limited to wire communications, and can be radio communications (infrared or radio wave), or the one using optical fibers.

The digital color multifunction product 1 will be explained next.

Figure 2:
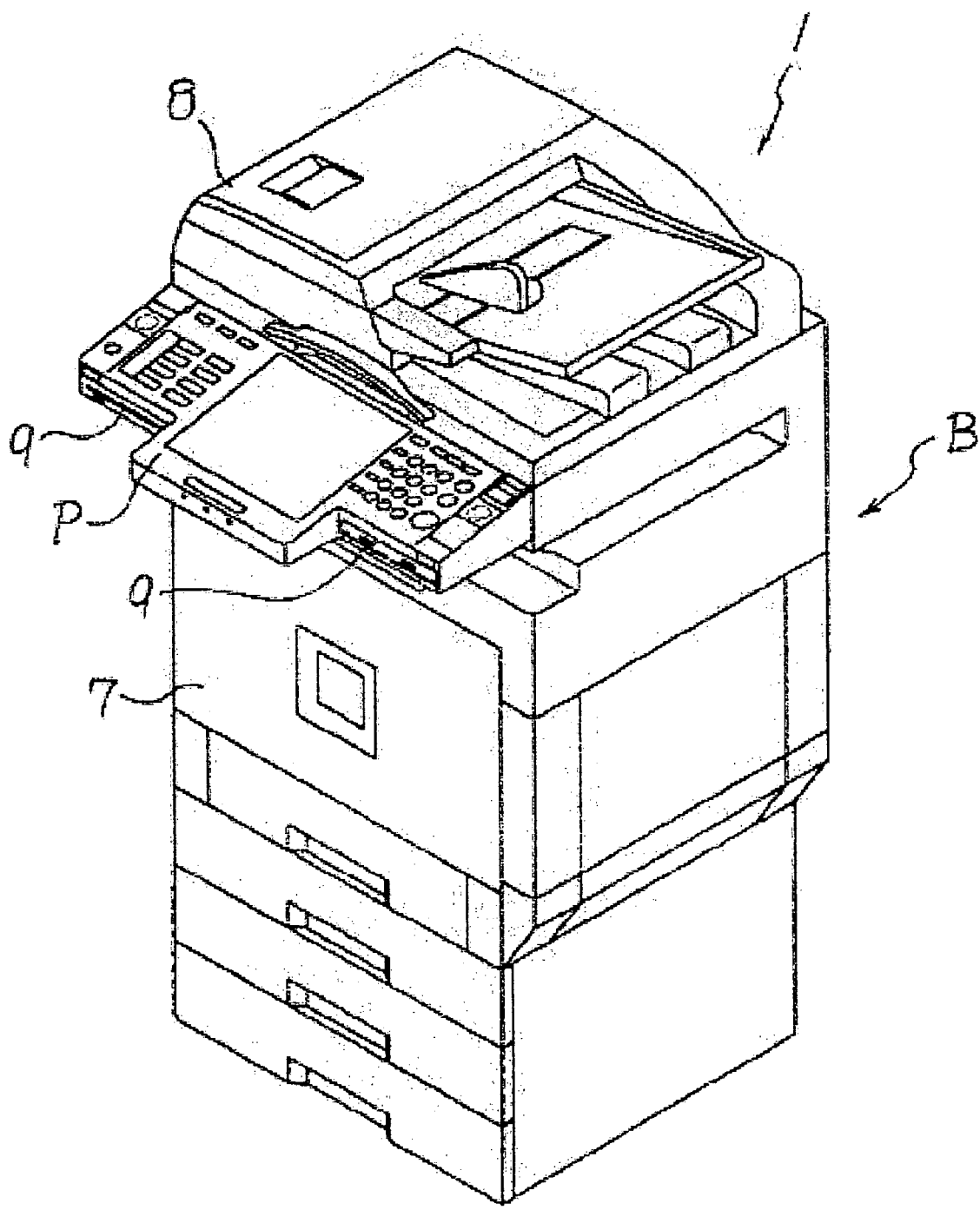
FIG. 2 is a perspective view schematically depicting the appearance of the digital color multifunction product.
Figure 3:
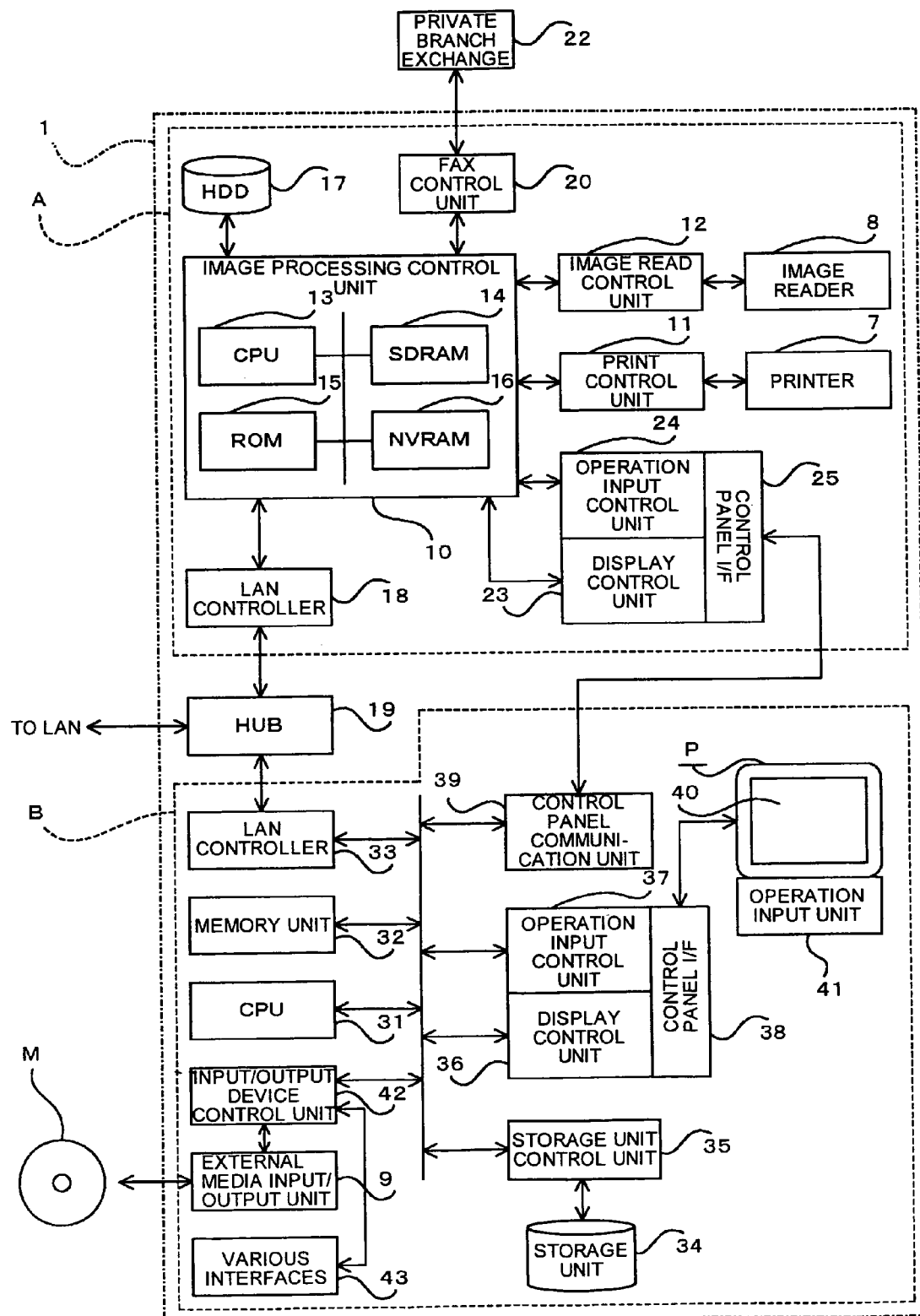
FIG. 3 is a block diagram of the electric connection between respective parts of the digital color multifunction product.

FIG. 2 is a perspective view schematically depicting the appearance of the digital color multifunction product 1, and FIG. 3 is a block diagram of the electric connection between respective parts of the digital color multifunction product 1.

As shown in FIG. 2, the digital color multifunction product 1 has a configuration such that an image reader 8 that reads an image from an original document is arranged above a printer 7 that forms an image on a medium such as transfer paper.

An operation panel P that allows various kinds of inputs, such as display to an operator and function setting from the operator, is provided on the outside of the image reader 8.

An external media input/output unit 9, being a unit that reads a program code and image data stored on a recording medium M (see FIG. 3) such as an optical disk or a flexible disk, or writes the program code and image data onto the recording medium M is provided on the lower part of the operation panel P, with an insertion port for allowing insertion of the recording medium M being exposed toward the outside.

The structure of the digital color multifunction product 1 is largely divided into an image processing unit A and an information processing unit B, as shown in FIG. 3. The printer 7 and the imager reader belongs to the image processing unit A, and the operation panel P and the external media input/output unit 9.belong to the image processing unit B, which becomes a computer for performing various kinds of information processing.

The image processing unit A will be explained first.

The image processing unit A including the printer 7 and the image reader 8 includes an image processing control unit 10 that controls the entire image processing in the image processing unit A, and the image processing control unit 10 is connected with a print control unit 11 that controls the printer 7, and an image read control unit 12 that controls the image reader 8.

The print control unit 11 outputs a print instruction including image data to the printer 7, so that the printer 7 forms an image on a medium such as transfer paper and outputs the image, under the control of the image processing control unit 10. The printer 7 can print a full color image, and the printing method thereof includes various methods such as an inkjet printing method, a sublimation dye transfer printing method, a silver salt photographic method, a direct thermal recording method, and a thermofusible transfer method, as well as the electrographic method.

The image read control unit 12 drives the image reader 8 under control of the image processing control unit 10, condenses the reflected light irradiated from a lamp with respect to the surface of the document onto a photodetector (for example, a charge coupled device (CCD)) by a mirror and a lens to read the document, and creates digital image data of eight bits for each of red/green/blue (RGB) by A/D conversion.

The image processing control unit 10 has a configuration of a microcomputer in which a central processor (CPU) 13, being a main processor, a synchronous dynamic random access memory (SDRAM) 14 that once stores image data read from the image reader 8 so as to be used for imaging by the printer 7, a read only memory (ROM) 15 that stores a control program and the like, and a non volatile random access memory (NVRAM) 16 that can hold data even at the time of power OFF, which records system log, system setting, log information and the like are connected to each other through a bus.

An HDD (magnetic disk unit) 17, which stores a large amount of image data and job history and the like, a local area network controller 18 that connects the image processing unit A to the local area network 2 via an HUB 19, which is a concentrator provided within the apparatus, and a FAX control unit 20 that controls the facsimile are respectively connected to the image processing control unit 10.

The FAX control unit 20 is connected to a private branch exchange (PBX) 22 connected to a public telephone network 21, and the digital color multifunction product 1 can communicate with a remote facsimile machine.

A display control unit 23 and an operation input control unit 24 are further connected to the image processing control unit 10. The display control unit 23 outputs an image display control signal to the information processing unit B via a communication cable 26 connected to a control panel interface 25 under control of the image processing control unit 10, to control image display with respect to the operation panel P in the information processing unit B.

The operation input control unit 24 inputs an input control signal corresponding to a function setting or an input operation by an operator from the operation panel P in the information processing unit B via the communication cable 26 connected to a control panel interface 25, under control of the image processing control unit 10.

In other words, the image processing unit A has a configuration such that it can directly monitor the operation panel P in the information processing unit B via the communication cable 26.

Therefore, the image processing unit A connects the communication cable 26 to the image processing unit included in a conventional image processor, so as to use the operation panel P in the information processing unit B.

In other words, the display control unit 23 and the operation input control unit 24 in the image processing unit A operate as the one connected to the operation panel P.

By such a configuration, the image processing unit A analyzes print data, being image information from external devices (the server computer 3, the client computer 4, a facsimile machine, and the like) and a command for instructing printing, develops the bit map so that the print data can be printed out as output image data, analyzes the printing mode from the command, and determines the operation. The print data and the command are received from the local area network controller 18 or the FAX control unit 20 and operated.

The image processing unit A can transfer the print data stored in the SDRAM 14 and the HDD 17, data read from the document, output image data obtained by processing the data read from the document for output, and compressed data obtained by compressing the data read from the document to external devices (the server computer 3, the client computer 4, facsimile machine, and the like).

The image processing unit A transfers the image data read by the image reader 8 to the image processing control unit 10, corrects signal deterioration accompanying the optical system and quantization to a digital signal, and writes the image data in the SDRAM 14. The image data stored in the SDRAM 14 is converted to the output image data by the print control unit 11, and output to the printer 7.

The information processing unit B including the operation panel P will be explained next.

The information processing unit B has a configuration of a microcomputer such that it is controlled by a general-purpose operating system (OS) used for information processor, such as a general personal computer. The information processing unit B has a CPU 31, being the main processor. A memory unit 32 formed of a random access memory (RAM) that becomes a work area for the CPU 31, a ROM, which is a read only memory storing a startup program and the like, and a storage unit control unit 35 that controls input and output of data with respect to a storage unit 34 such as an HDD that stores the OS and the application program are connected to the CPU 31 through the bus.

Further, a local area network controller 33 is connected to the CPU. The local area network controller 33 is a communication interface for connecting the information processing unit B to the local area network 2 via the HUB 19. The IP address, being a network address allocated to the local area network controller 33, is different from the IP address allocated to the local area network controller 18 in the image processing unit A.

That is, two IP addresses are allocated to the digital color multifunction product 1 in the embodiment.

In other words, the image processing unit A and the information processing unit B are respectively connected to the local area network 2, and data exchange is possible between the image processing unit A and the information processing unit B.

Since the digital color multifunction product 1 is connected to the local area network 2 via the HUB 19, it can be seen as a one device that is allocated only one IP address. Connection can be easily handled without damaging the appearance.

Figure 4:
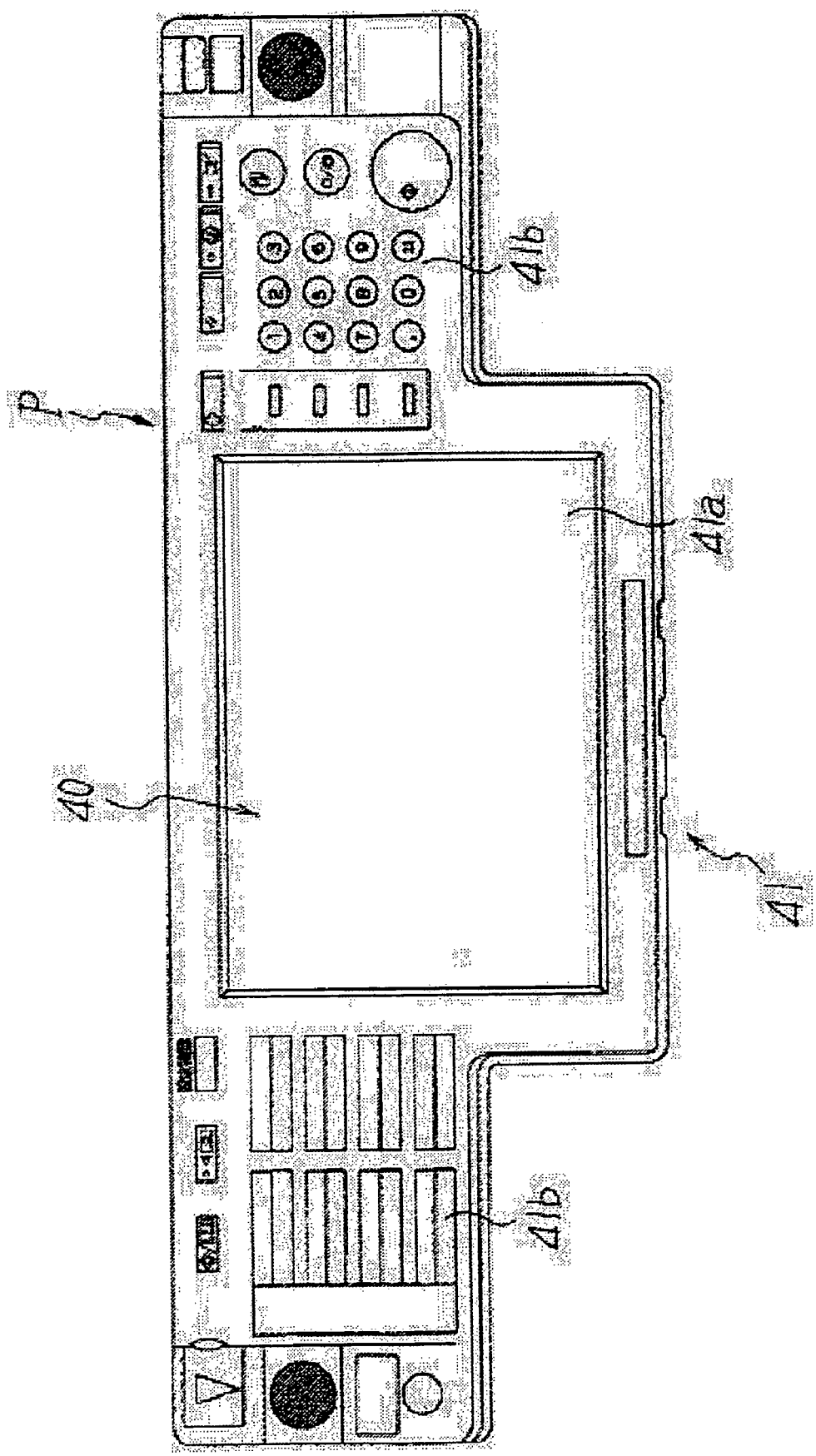
FIG. 4 is a plan view of the configuration of an operation panel.

Further, a display control unit 36 and an operation input control unit 37 for controlling the operation panel P are connected to the CPU 31. FIG. 4 is a plan view of the configuration of the operation panel P.

As shown in FIG. 4, the operation panel P includes a display unit 40, which is for example a liquid crystal display unit (LCD), and an operation input unit 41. The operation input unit 41 includes a touch panel 41a of a ultrasonic sound wave method laminated on the surface of the display unit 40, and a keyboard 41b having a plurality of keys.

The keyboard 41b is provided with a start key for declaring start of image read, a ten key for inputting numeric values, a read condition setting key for setting a destination of the read image data, a clear key, and the like.

In other words, the display control unit 36 outputs an image display control signal to the display unit 40 via the control panel interface 38, so that the display unit 40 displays predetermined matter corresponding to the image display control signal. On the other hand, the operation input control unit 37 receives an input control signal corresponding to the function setting and input operation by the operator in the operation input unit 41 via the control panel interface 38.

Further, to the CPU 31 is connected a control panel communication unit 39, which is connected to the control panel interface 25 in the image processing unit A via the communication cable 26.

The control panel communication unit 39 receives the image display control signal output from the image processing unit A, and transfers the input control signal corresponding to the function setting and input operation by the operator from the operation panel P to the image processing unit A.

Though detailed explanation will be given later, the image display control signal from the image processing unit A received by the control panel communication unit 39 is converted to data for the display unit 40 on the operation panel P and output to the display control unit 36. The input control signal corresponding to the function setting and input operation by the operator from the operation panel P is data-converted to a format corresponding to the specification in the image processing unit A and input to the control panel communication unit 39.

The OS and the application program executed by the CPU 31 are stored in the storage unit 34. In this sense, the storage unit 34 functions as a recording medium that stores the application program.

When the user turns on the power of the digital color multifunction product 1, the CPU 31 starts up the startup program in the memory unit 32, reads the OS from the storage unit 34 into the RAM in the memory unit 32, to start up the OS. The OS starts up a program, reads information, and stores information, corresponding to the operation of the user. As a representative OS, Windows (registered trademark) system and the like are known. The operating program operated on the OS is referred to as an application program. The OS of the information processing unit B is the same as that of the information processing unit (the server computer 3, the client computer 4, and the like), that is, the general-purpose OS (for example, Windows, etc.)

The external media input/output unit 9 such as a flexible disk drive, an optical disk drive, an magneto-optical (MO) drive, a media drive or the like, which is a device that reads program codes and image data stored on a recording medium M recording the OS, various program codes (control programs) such as device driver and various application programs, and image data, that is, flexible disk, hard disk, optical disk (CD-ROM, CD-R, CD-RW, DVD-ROM, DVD-RAM, DVD-R, DVD+R, DVD-RW, DVD+RW, etc.), MO disk, or semiconductor media, or writes program codes and image data into the recording medium M, is installed in the digital color multifunction product 1 in the embodiment. The external media input/output unit 9 is controlled by an input/output device control unit 42 connected to the CPU 31 via the bus.

Therefore, the application program stored in the storage unit 34 can be the one obtained by installing the application program stored on the recording medium M.

Accordingly, the recording medium M can be a recording medium for storing the application program. Further, for example, the application program can be taken into and installed in the storage unit 34 from the external device via the Internet 6 and the local area network 2.

Various interfaces 43 such as a universal serial bus (USB), Institute of Electrical and Electronics Engineers (IEEE) 1394, small computer system interface (SCSI), and the like are connected to the input/output device control unit 42, so that various types of equipment (digital camera and the like) can be connected thereto via the various interfaces 43.

The characteristic processing executed by the digital color multifunction product 1 will be explained below.

The digital color multifunction product 1 is constructed such that a plurality of devices that performs processing different from each other, in this example, the image processing unit A and the information processing unit B, can perform processing respectively in standalone mode. Therefore, when the image read processing is being performed by the image processing unit A, the information processing unit B can perform different operation, such as receiving an e-mail. In such an example, since the results of the respective processing do not affect each other, there is no problem even if the image processing unit A and the information processing unit B are operating in standalone mode.

In the digital color multifunction product 1, in addition to this, the respective functions of the image processing unit A are used by the program operated by the information processing unit B, and the results thereof can be processed.

For example, such processing can be performed that the image document image data read by the image reader 8 in the image processing unit A is processed by predetermined character recognition software, to obtain a text document. To perform such processing, in the conventional multifunction product, it is necessary that (A) the data to be processed is transmitted to an external computer (personal computer (PC) or the like) having the character recognition software installed therein so as to be processed by the computer, or (B) the image processing unit A prepares the character recognition software so that it is operated by the image processing control unit 10.

As a problem in this case, as to (A), there is a problem in that unless the external computer is prepared at all times, the processing cannot be performed as required. When the software operated by the image processing control unit 10 is prepared as in the case of (B), there are problems in that (C) operation of the general-purpose application software in the system specialized for image processing deteriorates the original processing capacity of the multifunction product, and (D) in the system specialized for image processing, almost all commercially available software such as word processor and speech recognition does not operate because of incompatibility of the operating system, and hence, software development dedicated therefor becomes necessary.

On the other hand, in the digital color multifunction product 1, the so-called commercially available operating system 58 (see FIG. 5, for example, Windows) is operated in the information processing unit B, which is not affected by the operation of the image processing unit A, and hence, there is no problem like (A) and (B) above. However, if the image processing unit A and the information processing unit B operate in standalone mode at all times, such an object cannot be achieved that the respective functions of the image processing unit A are used by the program operated by the information processing unit B, and the results thereof are processed. Therefore, in the digital color multifunction product 1, the respective functions of the image processing unit A can be used by operating the program in combination with the processing module as shown in FIG. 5.

The processing module in FIG. 5 will be explained here.

Figure 5:
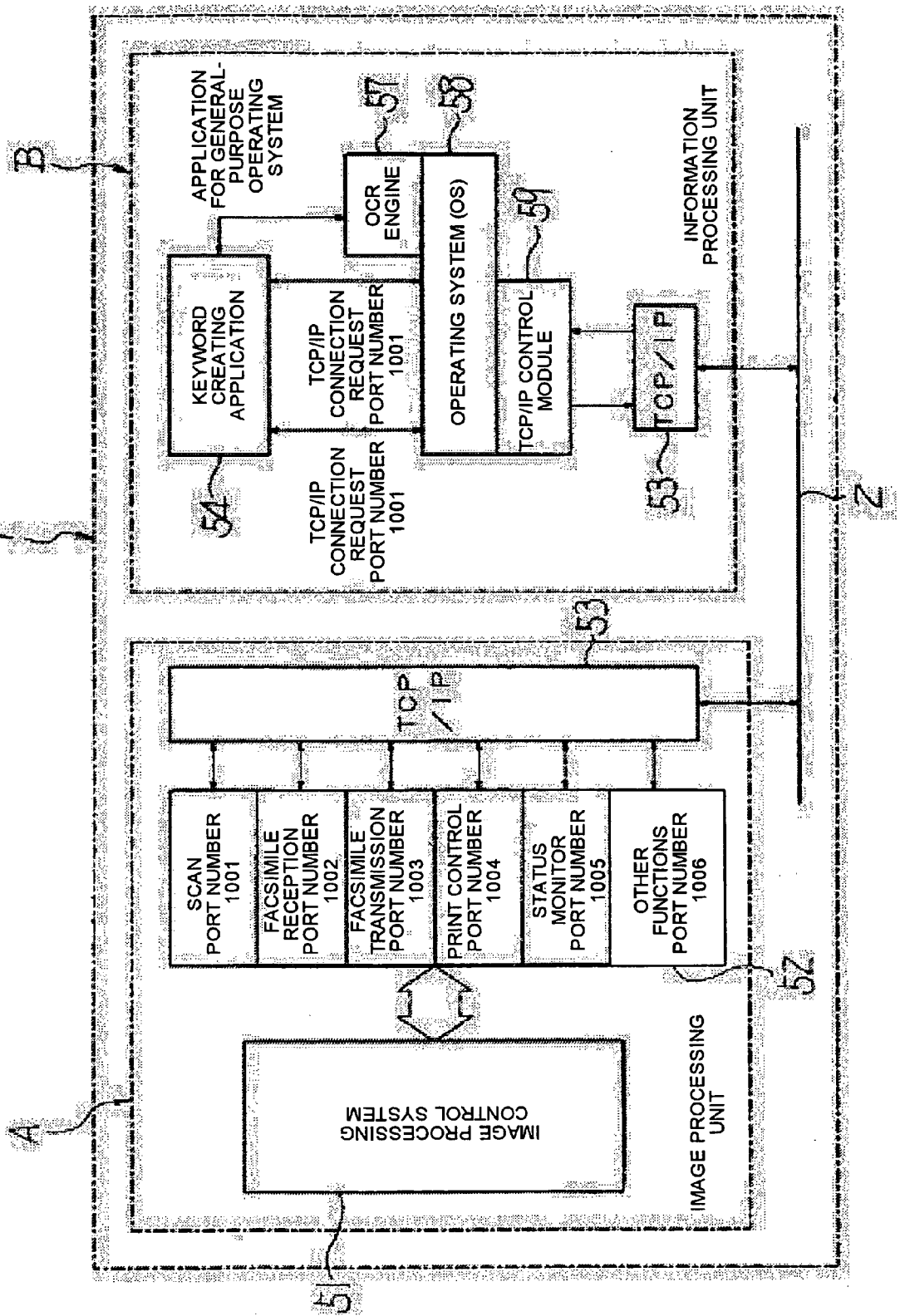
FIG. 5 is a block diagram of a processing module operated in the digital color multifunction product.
Figure 6:
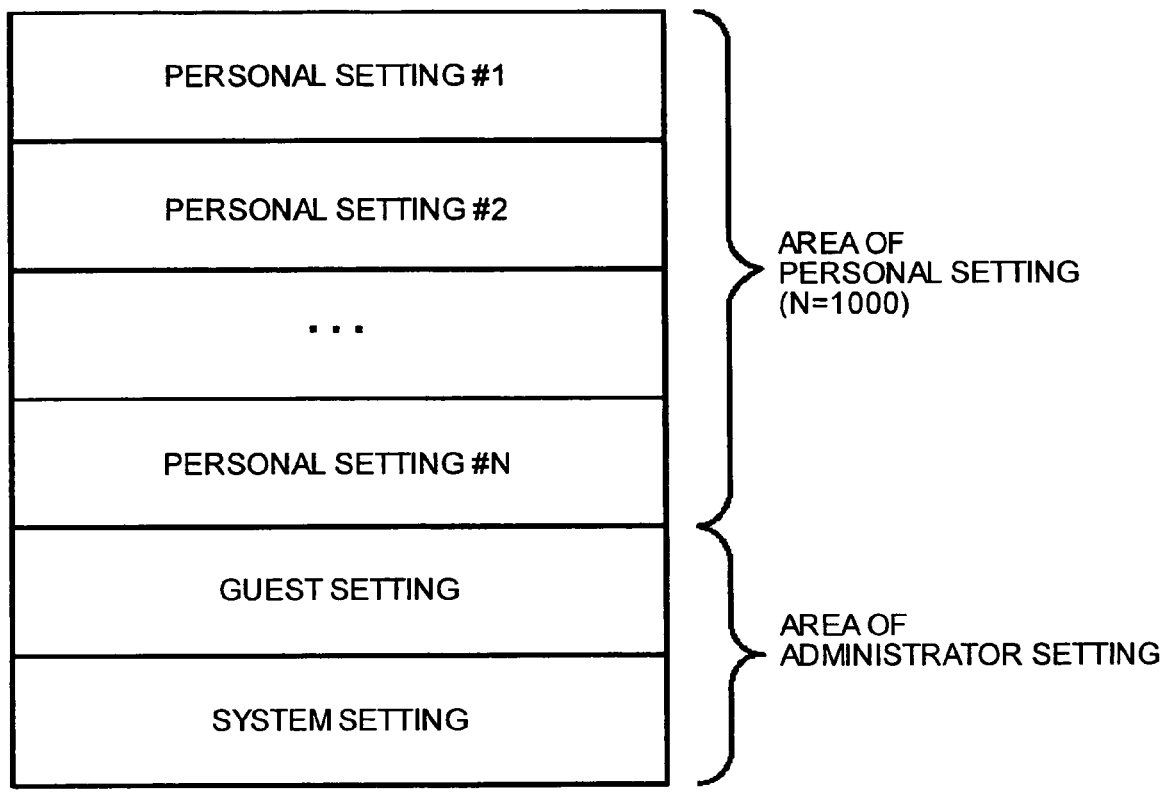
FIG. 6 is a schematic diagram of one example of an information area registered in an information processing unit of the digital color multifunction product.

In FIG. 5, a module in an image processing control system 51 includes a program for performing control so that the original functions of the multifunction product are executed by the digital color multifunction product 1. The digital color multifunction product 1 is provided with an interface with a network compatible functional module 52 that can be accessed only from the information processing unit B via a network (local area network 2).

The network compatible functional module 52 is for allowing the functions normally provided for the general multifunction product, for example, scanning function and FAX receiving function (executed by the image processing control system 51) to be used via the network (local area network 2), and cannot be used by the image processing unit A.

The network compatible functional module 52 has a configuration such that when a transmission control protocol/Internet protocol (TCP/IP) 53, which monitors access from the network at all times, detects a connection request for a corresponding port number, a processing module having the corresponding function is activated.

For example, when there is a connection request for port number 1002, a module of the FAX receiving function is activated. The activated module operates in cooperation with the processing request from the source of the connection request, to return a necessary response.

The characteristics of the program operated by the information processing unit B will be explained next. As an example, a keyword creating application 54 will be explained.

The keyword creating application 54 performs character recognition processing with respect to the read image data, to create a keyword from the character recognition result. In the entire information processing unit B, the respective applications operate under control of the operating system 58.

The respective applications can use the functions provided by the operating system 58. That is, in the program executing the application, the respective applications use the functions in such a form that the function is called up as a module, being a part of the software, to perform necessary processing. As an example, there is a TCP/IP control module 59 or the like. The TCP/IP control module 59 executes a function normally equipped in the operating system 58 for communicating with other devices connected via the TCP/IP 53.

Independent software incorporated so as to be used by other applications can be also used. For example, an OCR engine 57 performs only the character recognition processing from the image data. The OCR engine 57 does not operate in standalone mode, and is used as the part (module) of other software.

Thus, since the respective applications can operate under control of the operating system 58 in the information processing unit B as a whole, an application in which a single function is used or a plurality of these functions is combined can be developed.

In the current technique, however, the function of the image processing unit A or the like cannot be directly used by the above method.

In other words, in the digital color multifunction product 1, the image processing unit A for realizing the original function of the multifunction product and the information processing unit B for executing the application software are provided, and connected to each other via the network (local area network 2) by the network protocol (TCP/IP 53).

However, this means that only a physical connection is possible, and hence, data can be communicated between the image processing unit A and the information processing unit B, but the function of the image processing unit A cannot be used by the application software operated by the information processing unit B, only by using the existing technique.

Therefore, the method that allows the function of the image processing unit A to be used by the application software operated by the information processing unit B will be explained here.

For example, the image data to be subjected to character recognition processing is image data read from the image reader 8 controlled by the image processing unit A, in the keyword creating application 54.

To instruct the image read operation with respect to the image reader 8, it is necessary to specify the port number 1001 to request the image processing unit A to connect to the TCP/IP. At this time, the data indicating the processing content is also transmitted as a data stream. The function specified by the port number 1001 is the one for the image reader 8 to perform readout, and transfer the read image data with an optional file number to the information processing unit B side. Such processing content is prearranged, and allocated with a port number for using these functions independently.

Thus, the function of the image processing unit A can be used by the keyword creating application 54.

The communication protocol is not limited to the TCP/IP, and other methods can be used.

The digital color multifunction product 1 basically has a scanner function, a media browser function, a document browser function, a page browser function, an image processing function, a form synthesizing function, a transmission/storage function, a printing function, an OCR function, a search function, a facsimile function, a mail server function, a Web server function, a regular execution function, a system monitoring function, a security function, a history/status display function, a personal setting function, and administrator setting function, and the like.

With the scanner function, paper document is read in a form of image file, and transmitted by e-mail, by facsimile, or by file transmission (shared folder in Windows, FTP folder, Web folder, or external server). Alternatively, the paper document can be stored therein.

With the media browser function, files stored in a recording medium M can be read. Further, by setting the shared folder, FTP folder, or Web folder on the network as shared (virtual) media in personal setting, these folders can be read by the same operation as in the media.

With the document browser function, the stored file groups (documents), such as storage of general documents (temporary storage), received e-mails (storage of images attached to the received e-mails), received facsimiles (storage of facsimile images), can be operated and read. Further, a document management function is also provided, so that the document name can be changed, and a document can be deleted. The stored document can be read by the OCR to search a character in the image, or can be downloaded from websites.

With the page browser function, images in the apparatus body can be displayed. Selection of functions for transmitting or storing an image file or printing the image, and reading and editing of various types of information in the file are also possible.

The image processing function includes an automatic image processing function that enables image operation before transmission, storage, or printing of the image. It also enables correction of image quality and rotation of images, color subtraction, clipping or batch removal.

With the form synthesizing function, position information with background, to which a text or an image is attached, can be selected and synthesized before transmission, storage, or printing of the image, to create a new image. By cooperating with a form creation tool, transmission images and printed matter in various layouts can be created.

With the transmission function, images scanned from paper documents and files selected by the media browser or the document browser (page browser) can be e-mailed or faxed to a specific destination, or transmitted to a shared folder, FTP folder, Web folder, and an external server. With the storage function, for example, it becomes possible to search a specific character string in the images read by the OCR and stored in the digital color multifunction product 1, or to download files from websites to the digital color multifunction product 1.

With the printing function, images and files selected by the media browser or the document browser (page browser) can be specified and printed in various layouts (forms).

With the OCR function, texts can be extracted from images obtained by scanning paper or from received facsimile images by character recognition (OCR). The OCR function includes a function of creating a portable document format (PDF) file (image PDF+OCR) including a text padded therein to transmit and store the PDF file, an OCR text search function at the time of storage, and an OCR destination/document name function of using the character string obtained by OCR as the destination/document name. As the OCR destination, the OCR character string in a specific area agreeing with a registered destination is used. As the OCR document name, the OCR character string in a specific area is used.

With the search function, the document name or file name, stored date and time or updated date and time, or an OCR text is used as a keyword to extract and display an image or a file stored or present on the network having a content agreeing with the keyword. The object of the OCR text search is character strings obtained from an image by OCR.

With the facsimile function, image information received from facsimile ports (up to three facsimile communication ports: G3-1, G3-2, G4-1) prepared by the digital color multifunction product 1 is stored in an image file, and distributed by transfer (e-mail transfer or file transfer). The received facsimile can be distributed to destinations by sender and by reception port according to the initial setting. Further, image files from paper document, media, and storage can be transmitted by facsimile, or an image attached to a received e-mail can be transferred to other facsimile machines.

The mail server function includes a function of transmitting e-mails, and a function of creating and holding an e-mail address for a guest and a person (at the time of setting small mail transfer protocol (SMTP)), automatically printing or transferring by facsimile the image attached to the received e-mail, or performing transmission/storage one-touch operation, and transmitting an operation result e-mail to a sender.

As to a reception e-mail address, various operation combinations are prepared as default for each guest and person, and setup and change are made in the personal setting.

The same operation as that of at the time of SMTP setting can be performed by dispatching the e-mail address of an external mail server (at the time of post office protocol (POP) reception setting) by e-mail address display name. To correspond to various e-mail environments, e-mail transmission corresponds to SMTP authentication and the "POP before SMTP" mode, and e-mail reception also corresponds to authenticate POP (APOP).

With the Web server function, Uniform Resource Locator (URL) is respectively prepared for each guest and person, and images and files can be browsed, searched, downloaded, uploaded, transmitted, stored, or printed. Furthermore, the operation result can be referred, and personal setting/administrator setting can be set. Security during communication is taken into consideration, and the Web server function can correspond to secure socket layer (SSL) server authentication.

With the regular execution function, deletion of the stored content whose storage period has expired, reception of POP e-mails, update of lightweight directory access protocol (LDAP), automatic printing and deletion of history, and automatic restart are possible.

With the system monitoring function, disk full state, abnormality occurred in the apparatus, tray/door half-open indication, and paper jam are detected, to display a screen for displaying a message (including a service call (SC screen)). Further, it can correspond to an accounting device that monitors and restricts the use by the user.

With the security function, to protect the data from being used illegally by the guest or from an external network, security with respect to a user of the operation unit (individual authentication function, administrator password and the like), and security with respect to the network (authentication of e-mail transmission, APOP, SSL server authentication of the website, restriction of access, and the like) can be realized.

With the history/status display function, it can be determined whether transfer of e-mails, facsimile, and files and the printing result are normal, executed and finished date and time can be confirmed, and cancellation of a job and the content of error at the time of execution can be confirmed.

With the personal setting function, environment setting for each person can be registered, without the use environment of an individual user (e-mail address registration, screen/operation customization, reception e-mail address setting, and the like) being seen from others. The settable number of persons is 1000.

With the administrator setting function, various setting function with respect to guest users, basic functions (network setting, time setting, and automatic restart time) for operating the various functions, and an administration function (user control, e-mail environment setting, receive facsimile setting, and the like) can be set.

To realize these various functions, the information processing unit B in the digital color multifunction product 1 is provided with an area of personal setting in which personal setting for 1000 persons can be registered, and an area of setting for administrator in which guest setting and system setting are registered.

Specific examples of the personal setting, the guest setting, and the system setting will be explained below. Since the contents of the guest setting are basically the same as those of the personal setting, only a portion thereof different from the contents of the personal setting will be explained, and explanation for other portions is omitted. The combination of various information elements in the explanation and specific contents of the respective information elements are only illustrative and not restrictive.

Figure 7A:
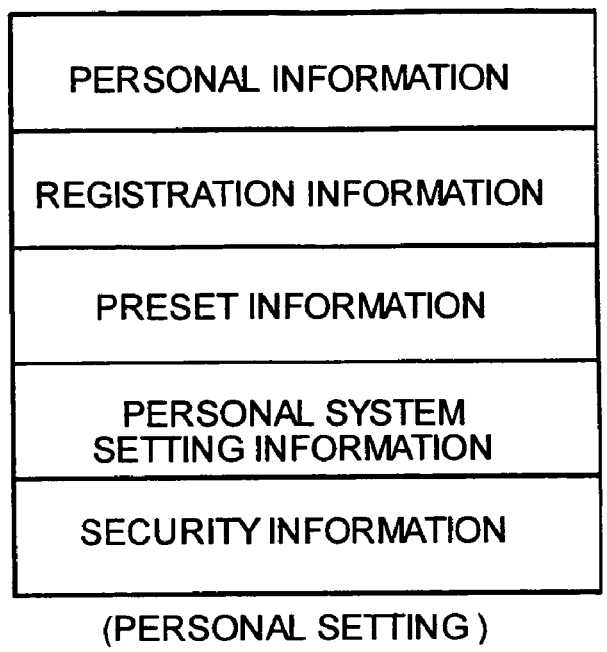
FIGS. 7A and 7B are schematic diagrams of one example of personal setting and personal information.

The personal setting includes, for example as shown in FIG. 7A, personal information for identifying respective individuals, registration information for registering e-mail address for each person, preset information for registering various condition for each person, personal system setting information for storing initial setting and the like at the time of using the digital color multifunction product 1, and security information for registering information relating to the security.

Figure 7B:
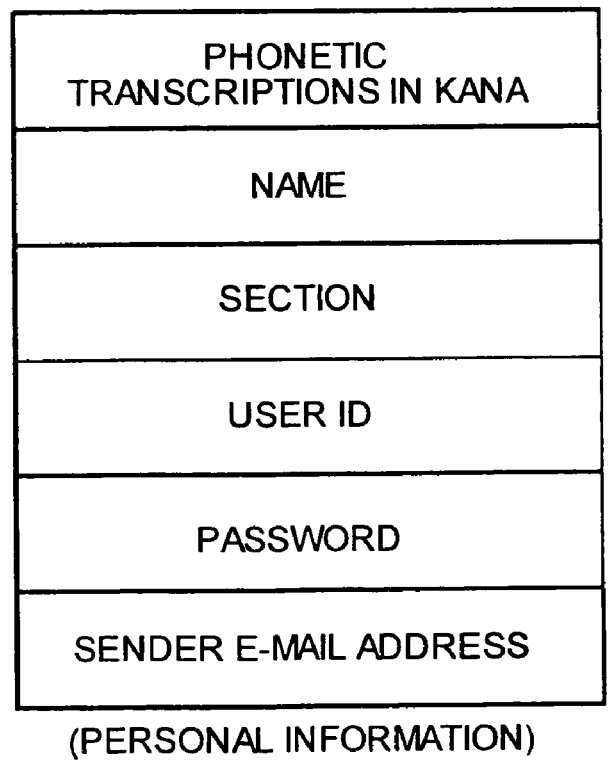

The personal information includes, for example as shown in FIG. 7B, "phonetic transcriptions in kana", "name", "section" expressing a section or department in which the person works, "user ID" for identifying each person, "password" used for authentication, and "sender e-mail address".

As to the "name", only names unique in the system of the digital color multifunction product 1 can be set, and for example, the name is used as a title of personal menu, and is a character string expressing each user.

The "user ID" is used, at the time of starting operation, when the user proceeds from a guest menu (initial setting state) to a personal menu, and is also used for a URL for personal menu in a Web (example, http://host name/"user ID"), and for a reception e-mail address (example, print."user ID" @host name.domain name).

The "sender e-mail address" is a character string set in the "From" field at the time of transmitting an e-mail, and in the case of default, it is automatically set in association with setting of the e-mail receiving protocol in the administrator setting.

For example, when the e-mail receiving protocol is set to POP or APOP, "name (of personal information) [sender.user ID] <POP e-mail address>" is set as a sender e-mail address in the case of default.

When the e-mail sending protocol is SMTP, "name (of personal information) sender.user ID@host name.domain name" is set as a sender e-mail address in the case of default.

The "sender" here is the default of reception e-mail address of [01] error e-mail in an incoming mailbox (described later). Therefore, after transmission of an e-mail, an error e-mail is transferred due to unknown destination and accumulated in "error e-mails" in the incoming mailbox.

The registration information includes, for example as shown in FIG. 8A, e-mail address (100 items) used as an address at the time of transmitting an e-mail, facsimile address used as an address at the time of sending a facsimile (100 items), group address (100 items), and file address (100 items) used as an address at the time of transmitting a file, for example, subject/text (100 items), being an subject set in a "Subject" field or the content set in the text information of an e-mail at the time of transmitting the e-mail, and document name or user name (100 items).

Figure 8B:
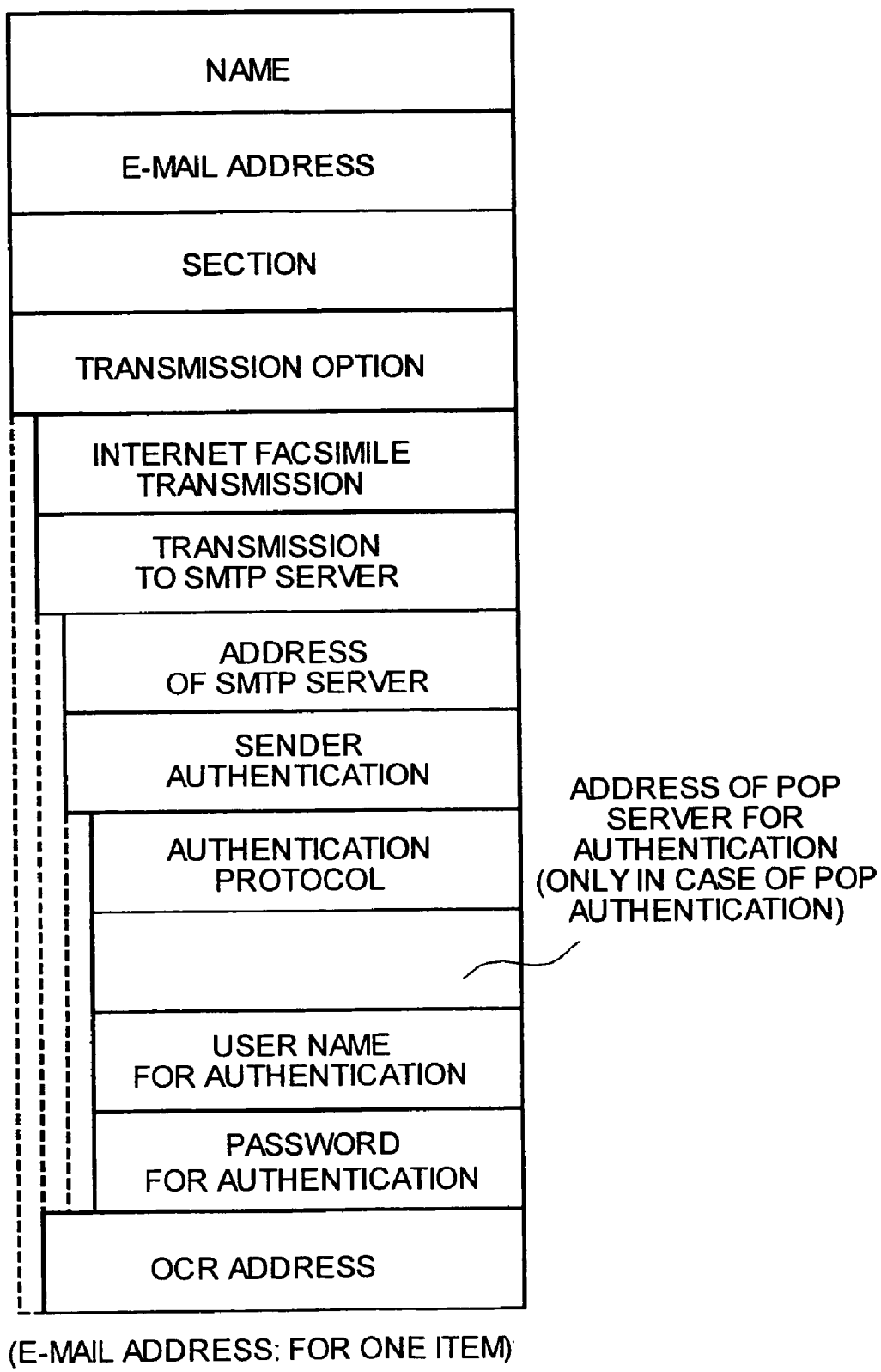

The e-mail address includes, for example as shown in FIG. 8B, "name", "e-mail address", "section", and "transmission option (whether to specify or not)". When the "transmission option" is set to "Yes", it further includes "Internet facsimile transmission" indicating whether to perform Internet facsimile transmission, "address of SMTP server" to specify the SMTP server, "sender authentication (Yes, No)" indicating whether to perform authentication at the time of e-mail transmission, and "OCR address (whether to use an address read by the OCR or not)".

When the "sender authentication" is set to "Yes", it includes "address of POP server for authentication", "user name for authentication", and "password for authentication".

All files to be attached to the e-mail address at which the "Internet facsimile transmission" is set to "Yes" are converted to network facsimile images (Tag Image File Format class-F: TIFF-F) and transmitted.

When the "OCR address" is set to "Yes", and when the OCR is defective or there is no address read by the OCR, the e-mail is transmitted to a registered e-mail address.

The e-mail address can be registered from an e-mail address obtained from the mail server (by LDAP) (using a public address book function).

Figure 8C:
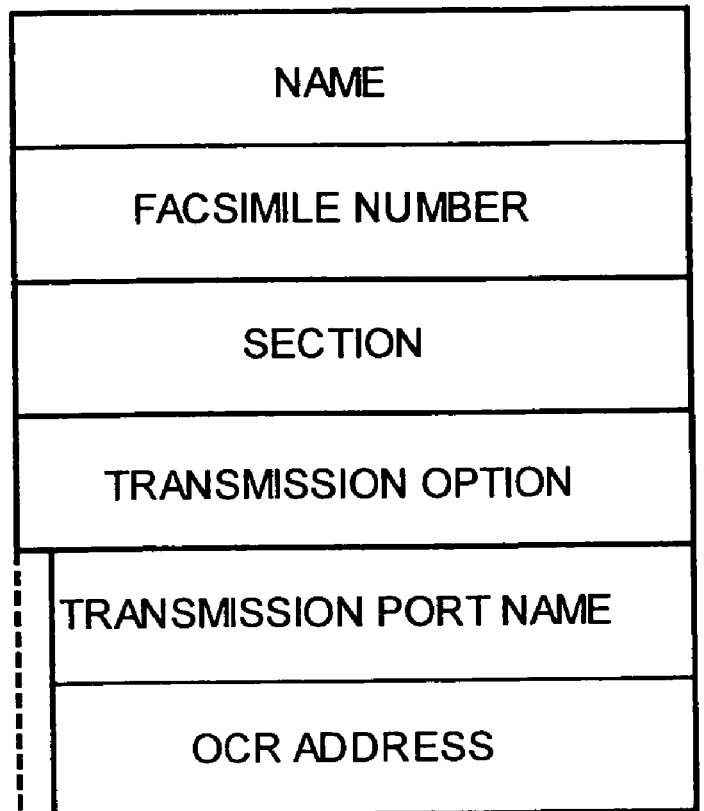

The facsimile address includes, for example as shown in FIG. 8C, "name", "facsimile number", "section", and "transmission option (whether to specify or not)".

As to the "name (personal address)", the same value in the personal facsimile address cannot be registered.

When the "transmission option" is set to "Yes", it further includes "transmission port name" and "OCR address (Yes, No)". When the "OCR address" is set to "Yes", and when the OCR is defective or there is no address read by the OCR, the e-mail is transmitted to a registered e-mail address.

Figure 8D:
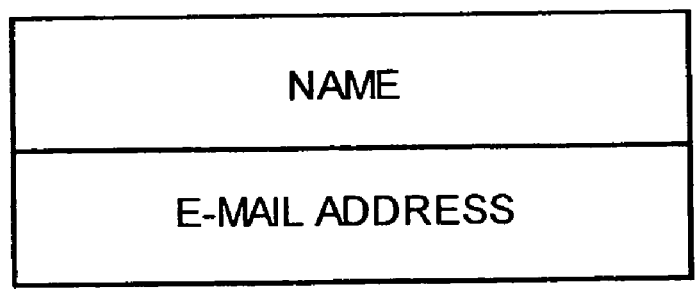

The group address includes, for example as shown in FIG. 8D, "name" for identifying a group address, and "e-mail address" in which one or more e-mail address are registered.

As to the "name (group)", the same value in the personal group address cannot be registered. Further, the same e-mail address cannot be registered in one group.

The file address includes, for example as shown in FIG. 8E, "name" for identifying the file address, "network path" in which a network path to transmit a file to a folder on an external server, such as a Windows shared folder, FTP folder, or HTTP folder, is registered, "login user name", "login password", "subfolder name" for registering a name of subfolder to be created on the server identified by the file address, and "communication option (whether to specify or not)".

When the "communication option" is set to "Yes", it further includes "FTP Japanese mode (shift Japan industry standard (JIS), extended Unix cord (EUC))", "FTP data transfer mode (PORT mode, PASV mode)", and "OCR address".

The "network path" here includes a local path as shown in FIG. 9B, other than the network path shown in FIG. 9A.

The "external server plug-in" in the drawing refers to a function by which file transmission to an external server is made possible, and shared media can be specified, without noticing a difference in interface, in the same image as that of the scheme such as file, ftp, and http(s), with respect to various external servers. Further, "compact flash", "smart media", "secure digital (SD) memory card", and "memory stick" are registered trademark of respective manufacturers.

Figure 9C:
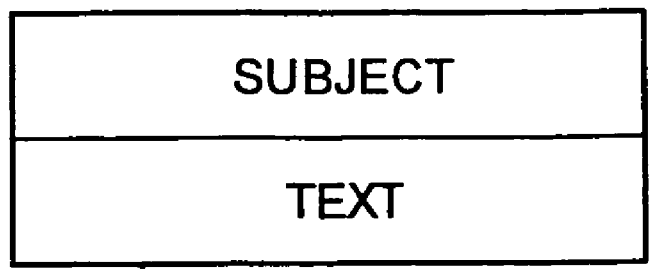

The subject/text includes, for example as shown in FIG. 9C, "subject" under which a character string used as a subject at the time of transmitting an e-mail is registered, or "text" in which character strings in the text at the time of transmitting the e-mail is registered.

Figure 9D:
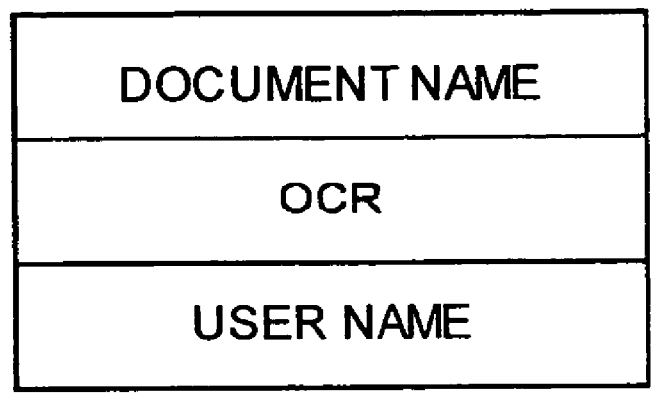

The document name/user name includes, for example as shown in FIG. 9D, "document name" under which a character string used as a document name at the time of storage is registered, "OCR (Yes, No)", and "user name" under which a regular character string used as the user name (document name at the time of transmitting a file) is registered.

When the "OCR" is set to "Yes", and at the time of failure of the OCR, the registered document name is used.

The preset information includes, for example as shown in FIG. 10A, read conditions (12), image processing conditions (12), transmission/storage condition one-touch (20), print condition one-touch (20), incoming mailbox (12), shared media addresses (12), and file transmission link addresses (12).

The read conditions, image processing conditions, and the file transmission link addresses are contents registered to preset buttons displayed on an operation screen, the transmission/storage condition and the print condition are contents registered to one-touch buttons displayed on the operation screen, and the incoming mailbox, shared media addresses, and the file transmission link addresses are contents registered to button icons displayed on the operation screen.

When the respective preset buttons, one-touch buttons, and button icons are operated, the contents registered to the respective preset buttons, one-touch buttons, and button icons are applied to the operation or the like at that time, and the operation is executed.

Figure 10B:
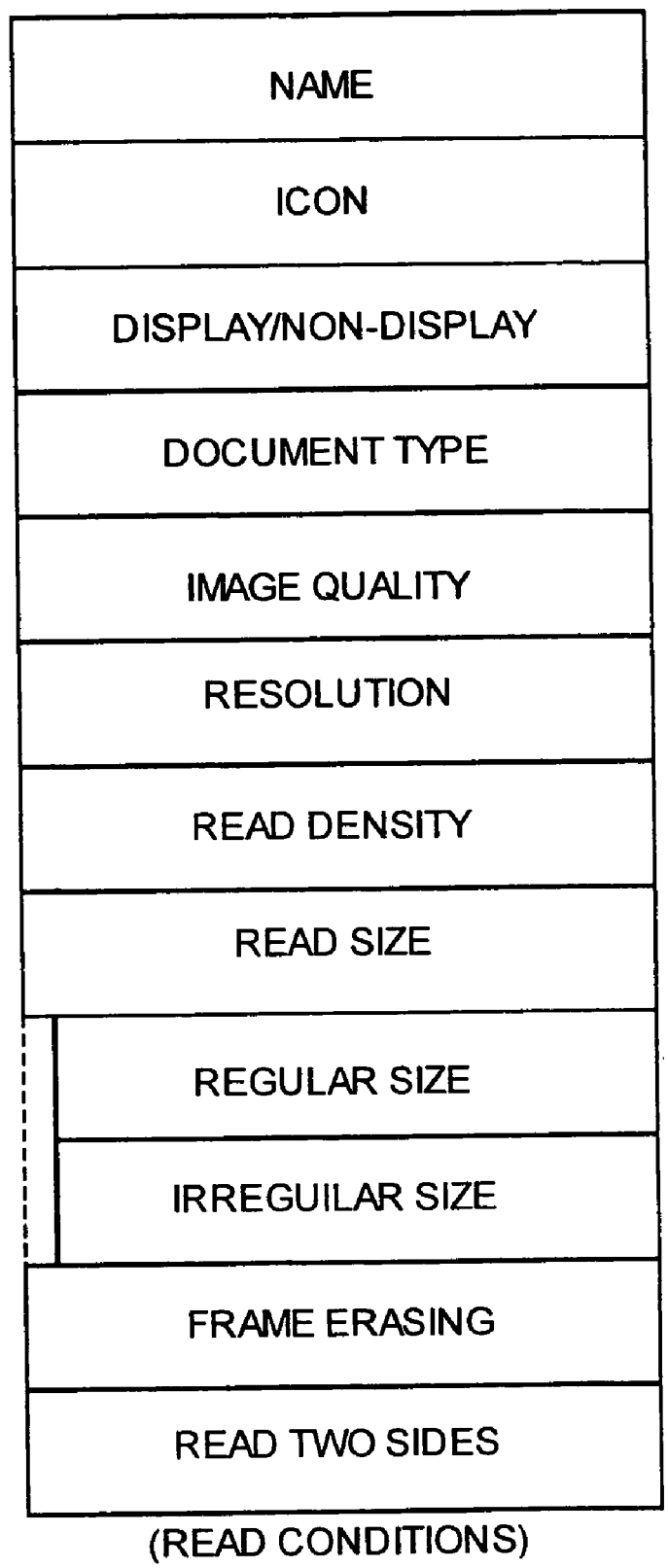

The read conditions includes, for example as shown in FIG. 10B, "name" for identifying the read condition on a preset button, "icon" for specifying an icon for displaying a simple image of the read conditions on the preset button, "display/non-display" for specifying whether to display the read conditions (when it is to be displayed, specification of the display mode is included), "document type (black and white characters, black and white photograph, grayscale, and full color) for specifying the type of the read document, " image quality (select from 9 levels of from "give priority to compression" to "give priority to image quality") for specifying the read image quality, "resolution (100 dots per inch (dpi), 200 dpi, 300 dpi, 400 dpi, and 600 dpi)" for specifying the read resolution, "read density (either automatic density or 7 levels of manual density)" for specifying the read density, "read size (automatic size detection, regular size, irregular size)" for specifying the read range on the read document, "frame erasing (Yes, No)" for specifying that a frame area of the read range specified by the read size is erased, and "read two sides" for specifying whether to perform two-sided read.

When the "read size" is other than the "automatic size detection", a specific value is set in the "regular size" or in the "irregular size", respectively.

Figure 11A:
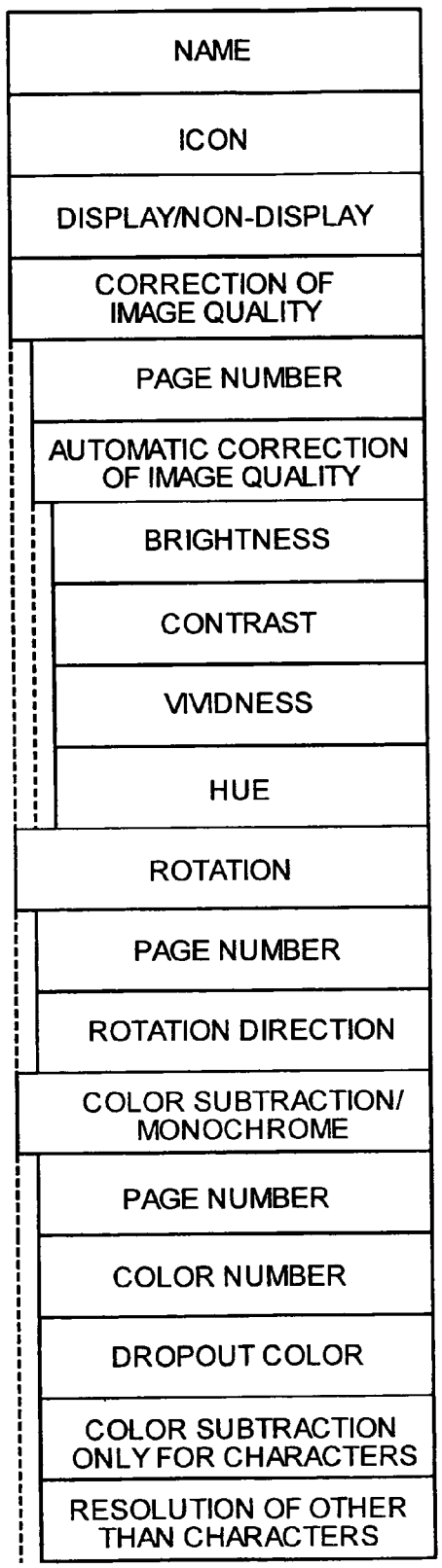
FIGS. 11A to 11B are schematic diagrams of one example of image processing conditions.
Figure 11B:
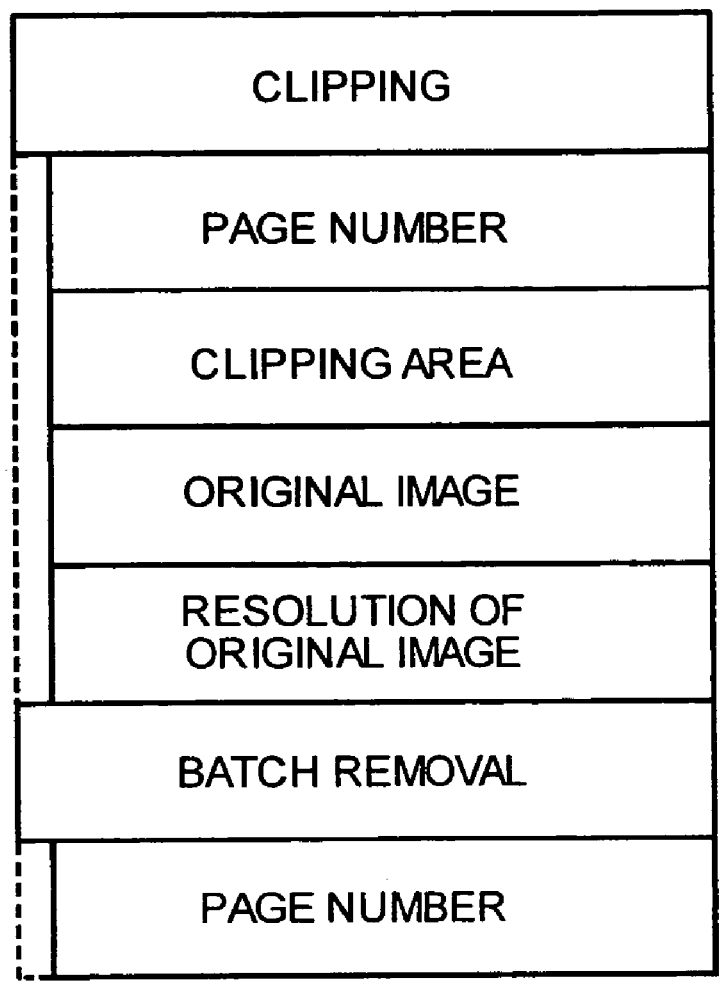

The image processing conditions include, for example as shown in FIGS. 11A and 11B, "name" for identifying the image processing condition on the preset button, "icon" for specifying an icon for displaying a simple image of the image processing conditions on the preset button, "display/non-display" for specifying whether to display the image processing conditions (when it is to be displayed, specification of the display mode is included), "correction of image quality (Yes, No)" for specifying whether to correct the image quality, "rotation (Yes, No)" for specifying whether to rotate the image, "color subtraction/monochrome (Yes, No)" for specifying whether to perform color subtraction processing or monochrome processing, "clipping (Yes, No)" for specifying whether to perform clipping of the image, and "batch removal" for specifying whether to perform batch removal for removing a blank image.

When the "correct image quality" is set to "Yes", it further includes "page number" for specifying a page number to which the image quality correction is applied, and "automatic correction of image quality (automatic, manual)" for setting the content of image quality correction. When the "automatic correction of image quality" is set to "manual", "brightness", "contrast", "vividness", and "hue", which are image quality correction items set manually, are included therein.

When the "rotation" is set to "Yes", it further includes "page number" for specifying a page number to which rotation is applied, and "rotation direction" for specifying the rotation direction.

When the "color subtraction/monochrome" is set to "Yes", "page number" for specifying a page number to which color subtraction or monochrome processing is applied, "color number" for specifying the color number after color subtraction, "dropout color (none, red, blue, green, chromatic color)" for specifying the dropout color, "color subtraction only for characters" for specifying whether to apply color subtraction or monochrome processing only to characters, and "resolution of other than characters (as it is, ½, ¼)" for specifying whether to change the resolution of the image after color subtraction.

When the "clipping" is set to "Yes", it further includes "page number" for specifying a page number to which clipping is applied, "clipping area (select from existing form data and form data obtained by specifying the area of the read image or the selected image and storing the image)" for specifying an image area to be clipped, "original image (leave or not to leave the original image, add before the original image, or add after the original image)" for specifying how to handle the original image, and "resolution of the original image (as it is, ½, ¼)" for specifying how to handle the resolution of the original image, when the original image is to be left.

When the "batch removal" is set to "Yes", it further includes "page number" for specifying a page number to which batch removal processing is applied.

Figure 12A:
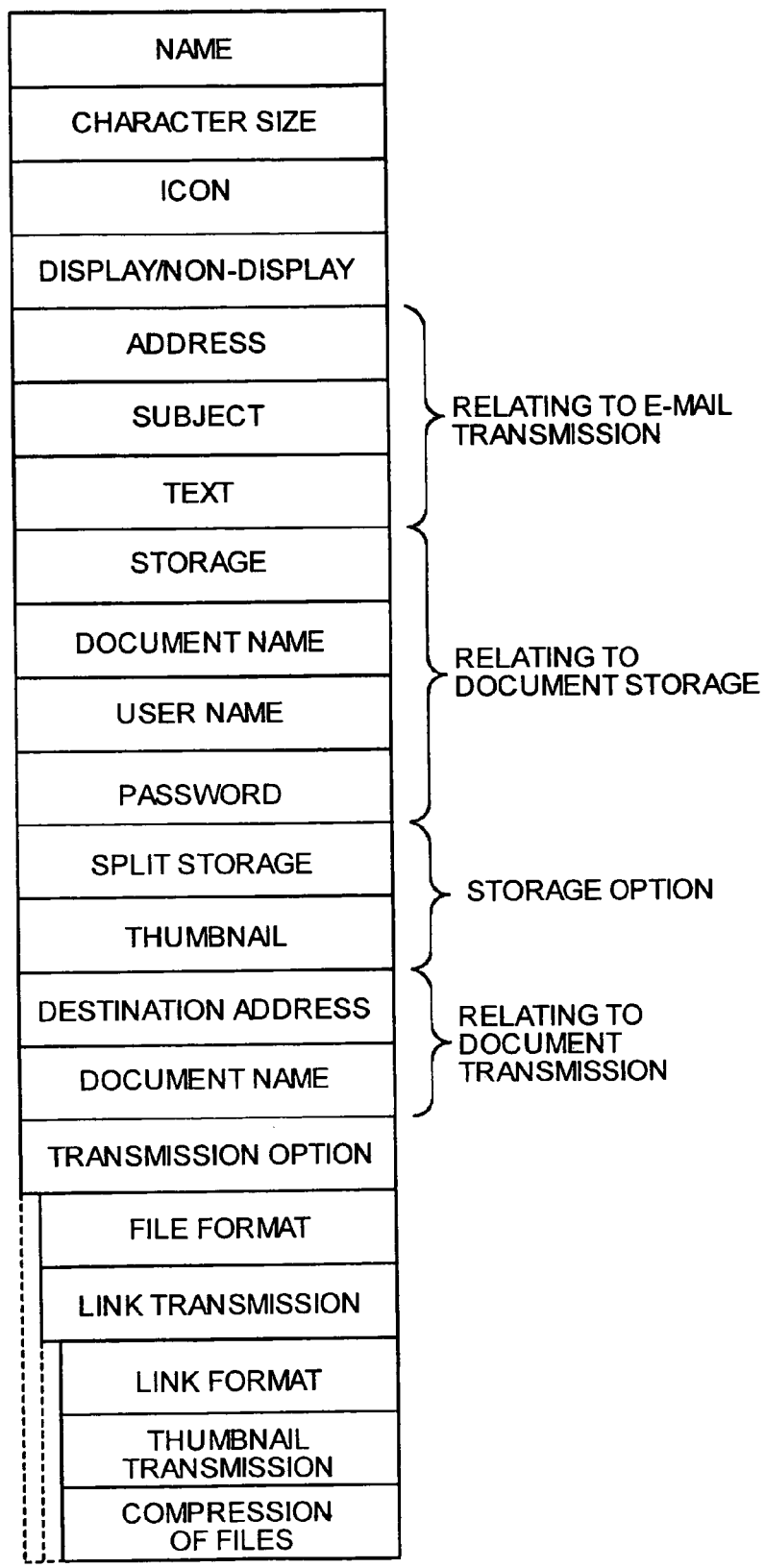
FIGS. 12A to 12B are schematic diagrams of one example of transmission/storage condition one-touch.
Figure 12B:
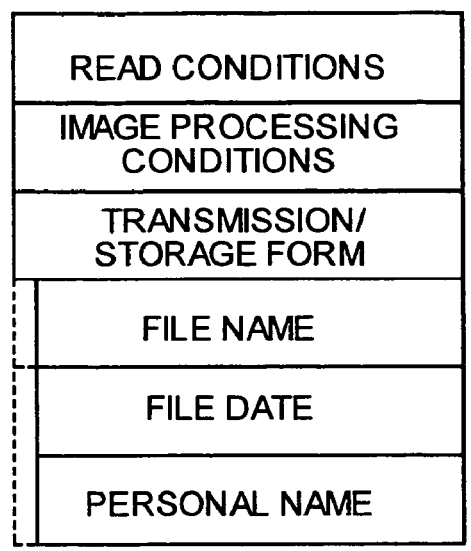

The transmission/storage condition one-touch includes, for example as shown in FIGS. 12A and 12B, "name" for identifying the transmission/storage condition on the one-touch button, "character size" for specifying the character size applied at the time of displaying the name on the one-touch button, "icon" for specifying an icon for displaying a simple image of the transmission/storage conditions on the one-touch button, "display/non-display" for specifying whether to display the transmission/storage conditions (when it is to be displayed, specification of the display mode is included), "addresses (up to 100)" in which one or more addresses at the time of e-mail transmission are registered, "subject" in which subjects at the time of e-mail transmission are registered, "text" in which the text content at the time of e-mail transmission is registered, "storage (to store it or not, to make it public or not) for specifying whether to store the document and whether to make the document public, "document name" in which the document name at the time of storing the document is registered, "user name" in which the user name requested in the authentication operation applied at the time of referring to the stored document is registered, "password" in which a password requested in the authentication operation applied at the time of referring to the stored document is registered, "split storage (Yes (number of pages of the document), No) for specifying whether to perform split storage at the time of storing the document, "thumbnail (Yes (specify page number and area), No)" for specifying whether to specify the page number and image area for creating a thumbnail image for the stored document, "destination address" in which addresses at the time of file transmission are registered, "document name" in which document names at the time of file transmission are registered, "transmission option (Yes, No)" indicating whether to specify the transmission option, "read conditions" for specifying the read conditions at the time of creating an image, "image processing conditions" for specifying the image processing conditions at the time of creating an image, and "transmission/storage form (Yes (select from form data), No)" indicating whether to specify the form at the time of transmission/storage.

When the "transmission option" is set to "Yes", it further includes "file-format (no change, image file, image PDF, image PDF+OCR)" for specifying whether to change the file format, and "link transmission (Yes, No)" indicating whether to perform link transmission.

When the "link transmission" is set to "Yes", it further includes "link format (document storage link, file transmission link (selected from file transmission link addresses))" for specifying the type of link format, "thumbnail transmission (Yes, No)" indicating whether to transmit a thumbnail image, and "compression of files (Yes, No)" indicating whether to compress files to be transmitted. When the "compression of files" is set to "Yes", at the time of e-mailing or transmitting, all the files are compressed by applying a predetermined coding and compression method.

When the "transmission/storage form" is set to "Yes", it further includes "file name (Yes, No)" indicating whether to subject the file name to form synthesis, "file date (Yes, No)" indicating whether to subject the file date to the form synthesis, and "personal name (Yes, No)" indicating whether to subject the personal name to the form synthesis.

The print condition one-touch includes, for example as shown in FIG. 13, "name" for identifying the print condition on a one-touch button, "character size" for specifying the character size applied at the time of displaying the name on the one-touch button, "icon" for specifying an icon for displaying a simple image of the print condition on the one-touch button, "display/non-display" for specifying whether to display the print condition one-touch (when it is to be displayed, specification of the display mode is included), "print format (layout printing, repeat printing)" for specifying the print format, "color format (full color, monochrome, two colors (black/magenta, black/cyan)" for specifying the color format, "priority (give priority to image quality, or to speed)" for specifying whether to give priority to image quality or speed at the time of printing, "two-sided printing (Yes (open horizontally, open vertically), No)" for specifying whether to perform two-sided printing, "sort/stack" for specifying the sortation processing after printing, "punch (Yes (two on the left, two on the top, two on the right), No)" for specifying punching after printing, "staple (Yes (upper left, upper right, center (bind in the middle), two on the left, two on the top, two on the right), No)" for specifying stapling after printing, "paper size (automatic paper size selection, select from selectable paper sizes)" for specifying the printing paper, "image processing conditions" for specifying the image processing condition at the time of printing, and "print form (Yes (select from form data), No)" for specifying the printing form.

When the "printing form" is set to "Yes", it further includes "file name (Yes, No)" indicating whether to subject the file name to the form synthesis, "file date (Yes, No)" indicating whether to subject the file date to the form synthesis, and "personal name (Yes, No)" indicating whether to subject the personal name to the form synthesis.

When the "printing form" is "repeat printing", the same image is used for the insert image to the form. For the "punch", "Yes" cannot be selected when a finisher is not installed, and the number of punch depends on the finisher. For the "staple", it is effective only when the number of sheets is two or more, and it cannot be selected when the finisher is not installed, and "bind in the middle" depends on the finisher.

For the "paper size", the paper size under selection is registered to the one-touch button on a printing detail setting screen.

Figure 14A:
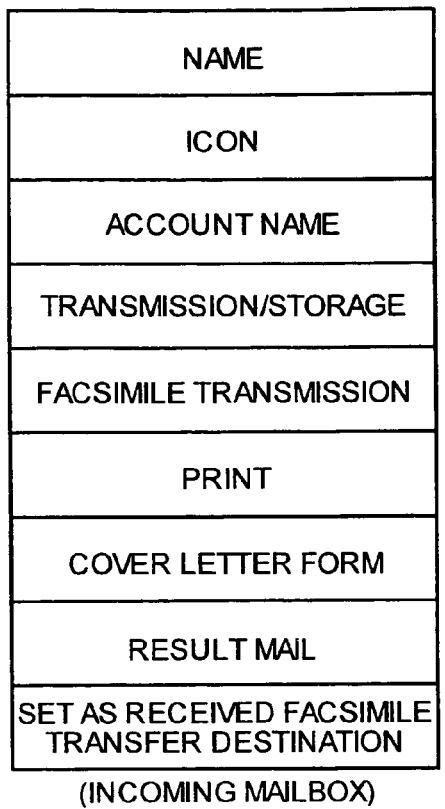
FIGS. 14A to 14E are schematic diagrams of one example of an incoming mailbox, initial values of names, initial values of account names, shared media address, and file transmission link address.

The incoming mailbox includes, for example as shown in FIG. 14A, "name" for identifying the incoming mailbox, "icon" for specifying an icon for displaying a simple image of the incoming mailbox, "account name" for registering an account name for using the incoming mailbox, "transmission/storage" in which "Yes" is set only for a storage-mailbox (described later), "facsimile transmission" in which "Yes" is set only for a facsimile mailbox (described later), "print" in which "Yes" is set only for a print mailbox (described later), "cover letter form (Yes, No)" in which "No" is fixedly set for an error mailbox (described later), and "Yes" is set for the facsimile mailbox and the print mailbox, and a selected value is set for other mailboxes, "result e-mail (Yes, No)" in which "No" is fixedly set for an error mailbox (described later), and a selected value is set for other mailboxes, and "set as received facsimile transfer destination" in which "Yes" is set only for stored mailbox, and "No" is set for other mailboxes.

Figure 14B:
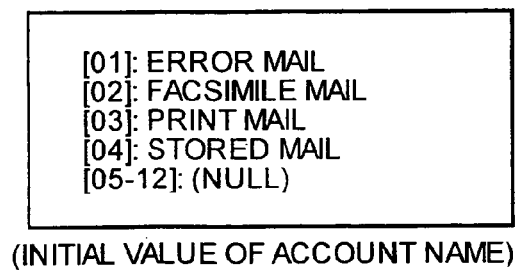

As to the "name", as shown in FIG. 14B, an error e-mail (error mailbox for receiving an error e-mail such as a delivery error notification of an e-mail), a facsimile e-mail (facsimile mailbox: received e-mails in this mailbox are handled as facsimile transfer e-mails), a print e-mail (print mailbox: received e-mails in this mailbox are handled as printing e-mails, that is, the content of the received e-mail (including attached files) is printed out), and stored e-mail (storage-mailbox: received e-mails in this mailbox are handled as stored e-mails, that is, the content of the received e-mail (including attached files) is stored) are respectively set in the incoming mailboxes [01] to [04] by system default. As for the remaining incoming mailboxes of from [05] to [12], the system default value is "null", and a user can optionally set.

Figure 14C:
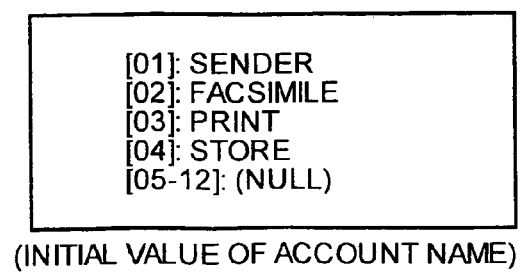

For the "account name", as shown in FIG. 14C, "sender", "facsimile", "print", and "store" are respectively set in the incoming mailboxes [01] to [04] by system default, so that the functions of the incoming mailboxes are made clear. As for the remaining incoming mailboxes of from [05] to [12], the system default value is "null", and a user can optionally set.

For the "account name", a unique character string is required for each incoming mailbox for each personal setting. The e-mail address becomes "display name"<account name=parameter.user ID@identification name.host name.domain name>. For the parameter, telephone number is the parameter for facsimile transmission, number of prints (when omitted, it means one print) for the print, and in the file transmission, no parameter is used. An actually usable SMTP/POP reception e-mail address is written on a set/store screen button.

For the "transmit/store", transmission/storage form can be specified by transmission/storage condition one-touch, and storage in this case becomes storage in the "general document". A private document name is stored in the "received e-mail" at all times without subject and password.

For the "facsimile transmission", the facsimile address taken out from a parameter of to e-mail address is automatically added to the e-mail address in the specified transmission/storage condition preset.

For the "print", the print format can be specified by using the print condition one-touch button.

The "cover letter form" is selected from forms that can be inserted in the e-mail header and the e-mail text. When "Yes" is selected, the form is applied only to the e-mail header/text. When "No" is selected, the form is adapted to the text file format in the standard setting. The text file attached to the e-mail is always adapted to the standard setting.

The "result mail" is a setting whether to return an e-mail of the output result. In the embodiment, since the output image can be read on the website, there is no attached file at all times.

In the "set as received facsimile transfer destination", only one in 12 incoming mailboxes can be set to "Yes", and an image is transferred to a user set at the time of receiving the facsimile.

Figure 14D:
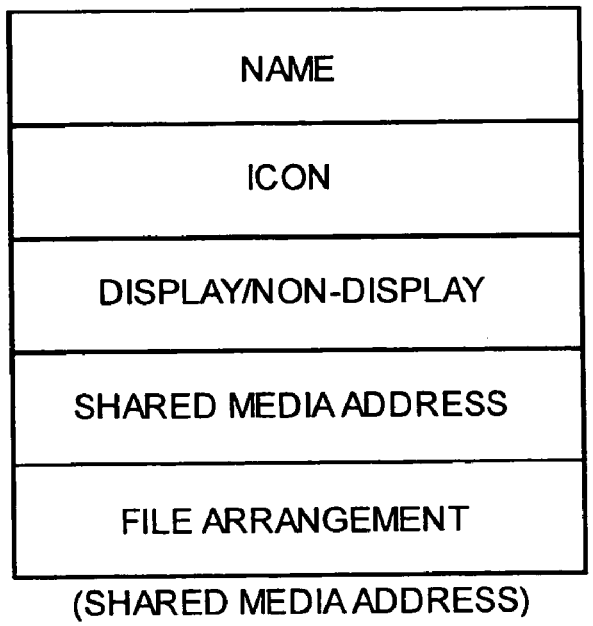

The shared media address includes, for example as shown in FIG. 14D, "name" for identifying the shared media address, "icon" for specifying an icon for displaying a simple image of the shared media address, "display/non-display" for specifying whether to display the shared media address (when it is to be displayed, specification of the display mode is included), "shared media address" in which an address selected from the "file address" in the registration information is stored, and "file arrangement order (not selected, ascending order of names, descending order of names, ascending order of dates, descending order of dates, ascending order of sizes, descending order of sizes)" for regulating the arrangement of files at the time of display.

When the "file arrangement order" is "not selected", the files are displayed in a physical arrangement on the media side. For example, in the case of a digital camera, the arrangement is normally according to the order of taking photographs, and in the ascending order of file names. In the case of an external server, the arrangement is according to the agreement in the external server, and for example, in the descending order of updated date and time. In this case, a new file is displayed at the top.

Figure 14E:
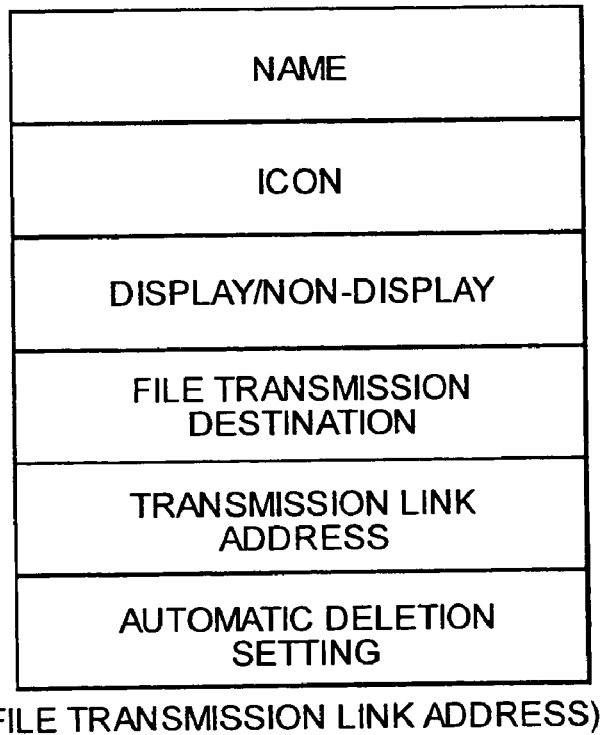

The file transmission link address includes, for example as shown in FIG. 14E, "name" for identifying the file transmission link address, "icon" for specifying an icon for displaying the file transmission link address as a simple image, "display/non-display" for specifying whether to display the file transmission link address (when it is to be displayed, specification of the display mode is included), "file transmission destination" for specifying the destination address of the file (i.e. an address to which the file is uploaded), "transmission link address" for specifying the link address for another user to access to the file, and "automatic deletion setting (Yes (storage period is from one day to 180 days), No)" for specifying whether to delete the file automatically at a predetermined timing.

Figure 15A:
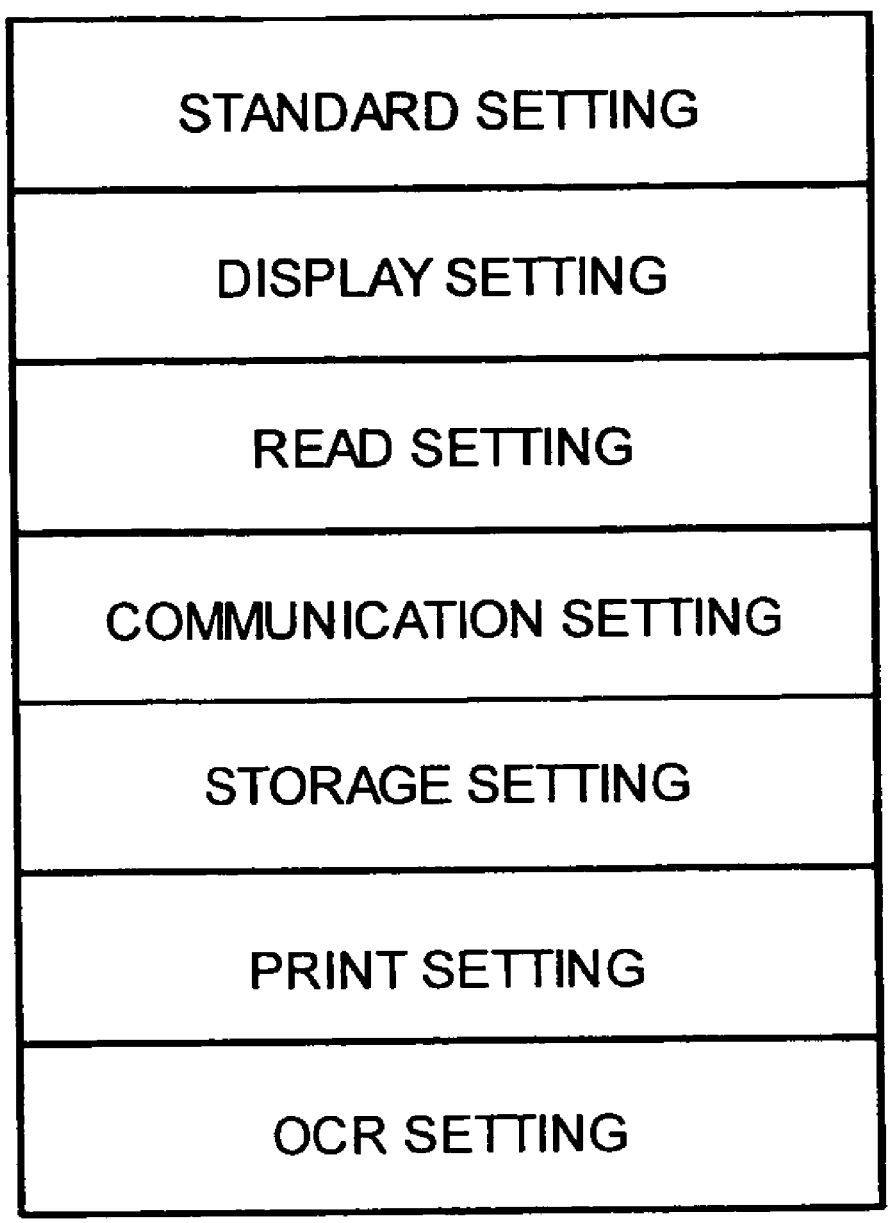

The personal system setting information includes seven categories, for example as shown in FIG. 15A, standard setting, display setting, read setting, communication setting, storage setting, print setting, and OCR setting.

The standard setting includes, for example as shown in FIG. 15B, "automatic close of personal menu (Yes (10 to 999 seconds), No)" for setting such that when no operation state continues, the personal menu is automatically closed (only for the personal setting), "auto-clear time (Yes (10 to 999 seconds), No)" for setting such that when the no operation state continues, an input value of the guest menu is automatically cleared (only for the guest setting), "return to main screen after finishing operation (Yes, No)" for specifying whether to return to the main screen after finishing the operation by the user, "key input/screen touch sound setting (Yes, No)" for specifying whether to allow the key input or screen touch sound to rumble, "automatic input of e-mail subject (Yes (select from registered subjects), No)" for specifying whether to automatically input the e-mail subject at the time of sending an e-mail, "automatic input of e-mail text (Yes (select from registered subjects), No)" for specifying whether to automatically input the e-mail text at the time of sending an e-mail, "compression setting at conversion to Tag Image File Format (TIFF) image (no compression, modified Huffman (MH), modified read (MR), or modified modified read (MMR) method)" for specifying the compression method when the image data is converted to an image in the TIFF format, "compression setting at conversion to joint photographic experts group (JPEG) image (any value from 9 levels) for specifying the image quality setting when the image data is converted to an image in the JPEG format, and "maximum number of colors at conversion to portable network graphics (PNG) image (2/4/8/16/32/64/128/256 colors) for specifying the maximum number of colors when the image data is converted to an image in the PNG format.

Figure 16:
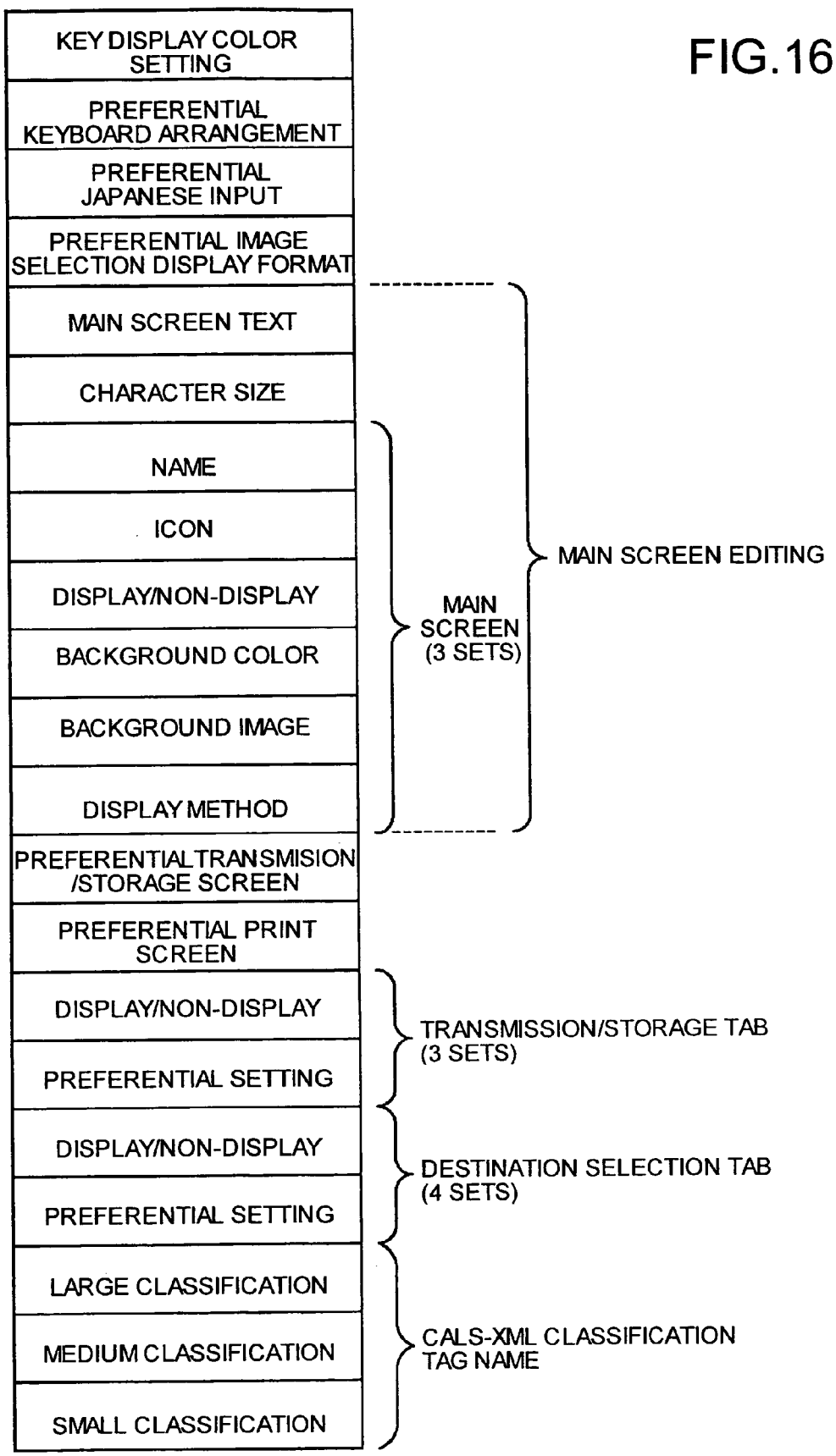
FIG. 16 is a schematic diagram of one example of display setting.

The display setting includes, for example as shown in FIG. 16, "key display color setting" for setting the display color of a keyboard to be displayed on a screen, "preferential keyboard arrangement (QWERTY type, ABC type)" for specifying the priority value in the key arrangement of the keyboard to be displayed on the screen, "preferential Japanese input (Roman character, Kana)" for specifying the priority value in the Japanese input method, "preferential image selection display method (thumbnail, list display)" for specifying the priority value in the display mode at the time of image selection, "main screen text" for specifying the type of text to be displayed on the main screen, "character size" for specifying the text size to be displayed on the main screen, "character size", "name", "icon", "display/non-display (Yes (rearrange), No)", "background color (Yes (select from Web safe color 216 colors), No)", "background image (Yes (select image), No)", and "display method (display in alignment, display in enlarged scale) for three main screens of "paper document", "media document", and "stored document", "preferential transmission/storage screen (one-touch screen, detailed setting screen" for specifying a screen to be preferentially displayed on a transmission/storage screen, "preferential print screen (one-touch screen, detailed setting screen" for specifying a screen to be preferentially displayed on a print screen, "display/non-display (Yes (rearrangement), No)" and "preferential setting" for three transmission/storage tabs of "e-mail transmission", "document storage", and "file transmission", "display/non-display (Yes (rearrangement), No)" and "preferential setting" for four address selection tabs of "e-mail address", "facsimile address", "group address", and "public address book", and "large classification", "medium classification", and "small classification" of CALS-XML classification tag name.

Figure 17A:
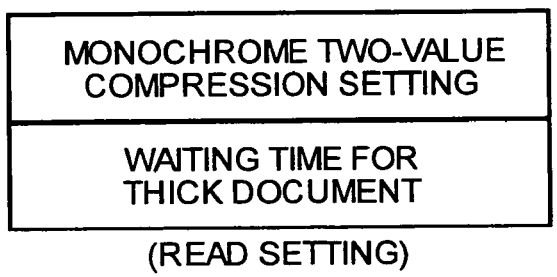
FIGS. 17A to 17C are schematic diagrams of one example of read setting, communication setting, and storage setting.

The read setting includes, for example as shown in FIG. 17A, "monochrome two value compression setting (no compression, MH, MR, or MMR method)" indicating setting for monochrome two value compression processing, and "waiting time for thick document (Yes (60 to 999 seconds), No)" indicating the setting of waiting time for a thick document.

Figure 17B:
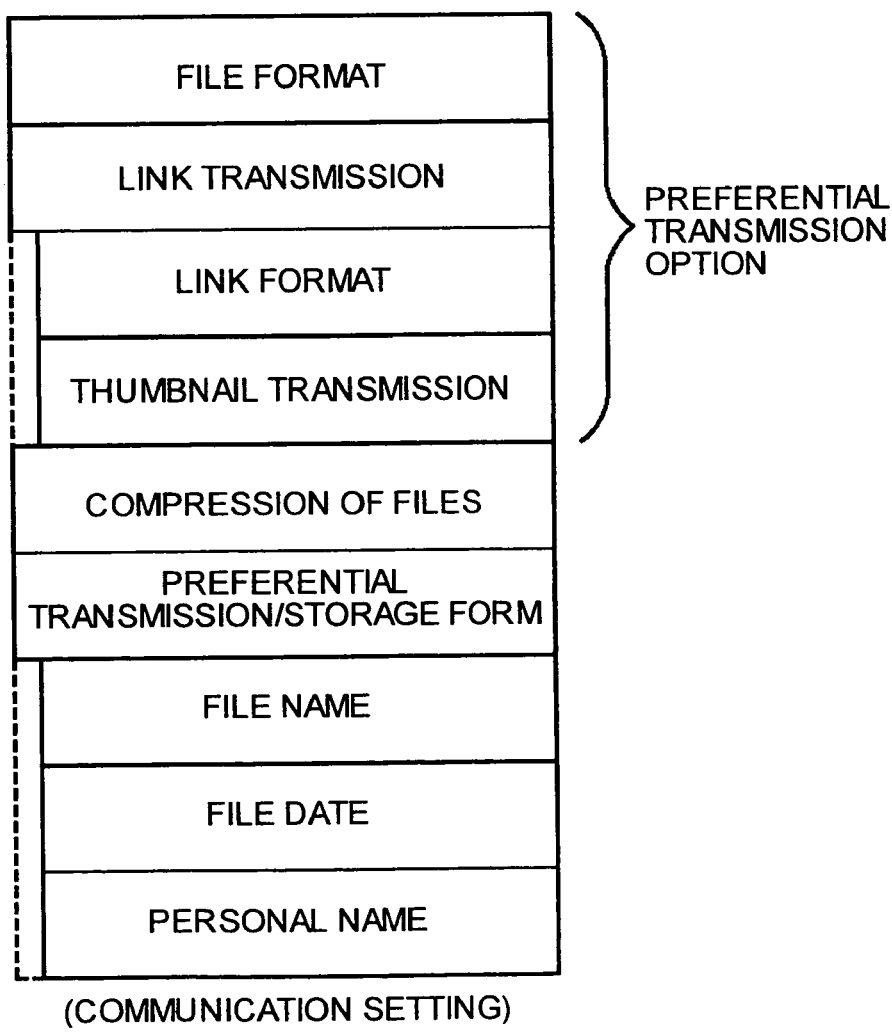

The communication setting includes, for example as shown in FIG. 17B, "file format (no change, image file, PDF, image PDF+OCR)" and "link transmission (Yes (described below), No)" (only effective for e-mail addresses) for preferential transmission options, "compression of files (Yes, No)", and "preferential transmission/storage form (default form)".

When the "link transmission" is set to "Yes", it further includes "link format (document storage link, file transmission link (selected from file transmission link addresses)" and "thumbnail transmission" (thumbnail is always transmitted in PDF format). A wired transmission option is effective when the transmission format is not specified in the transmission/storage condition preset.

The "preferential transmission/storage form" is used when the transmission/storage form is not specified by the transmission/storage condition one-touch button, and "file name (Yes, No)", "file date (Yes, No)", and "personal name (Yes, No)" are included therein.

Figure 17C:
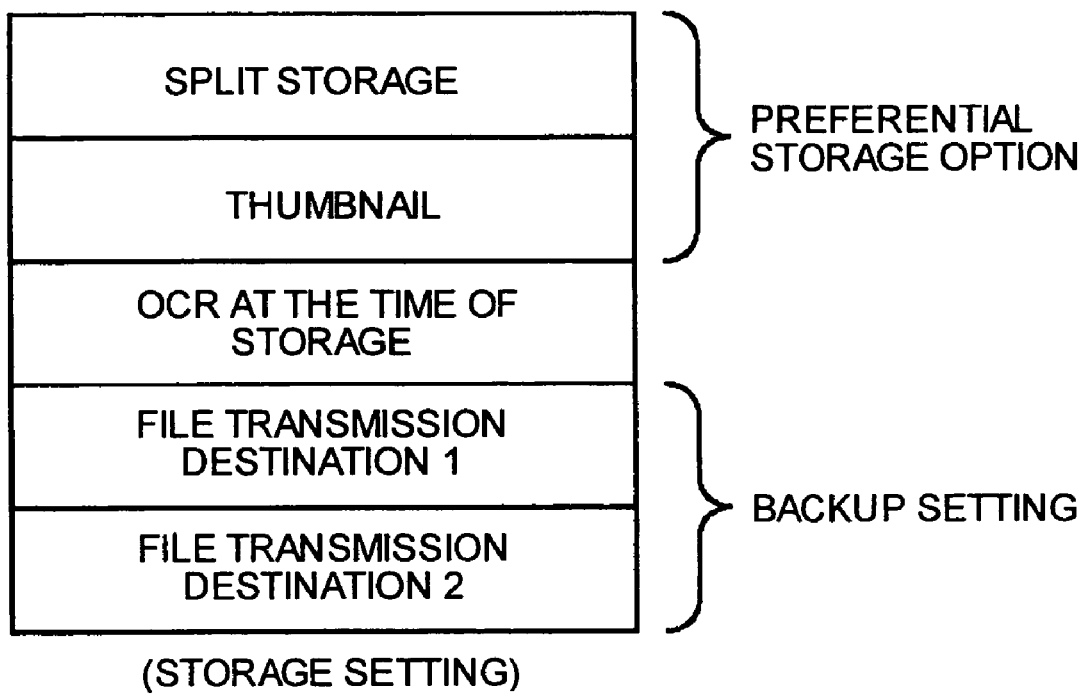

The storage setting includes, for example as shown in FIG. 17C, "split storage (Yes (number of pages for each split), No) and "thumbnail (Yes (specify page number and area), No)" as preferential storage options, "OCR at the time of storage (Yes, No)", "file transmission destination 1 (primary transmission destination)" and "file transmission destination 2 (secondary transmission destination)" as backup setting for setting a place to be copied at the time of storage.

When the "OCR at the time of storage" is set to "Yes", only general documents are subjected to OCR at the time of storing the document.

Figure 18A:
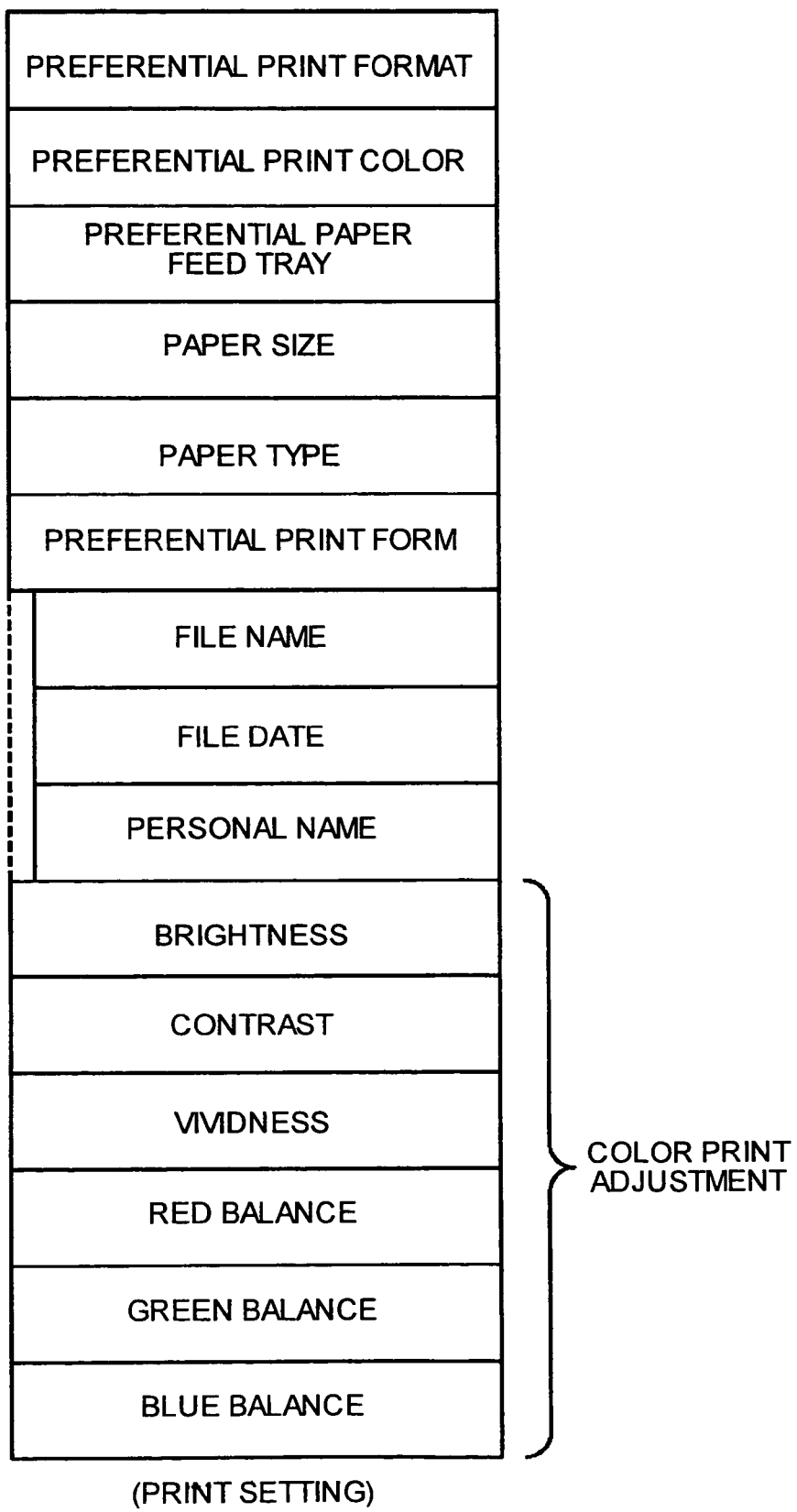

The print setting includes, for example as shown in FIGS. 18A and 18B, "preferential print format (layout printing, repeat printing)", "preferential print color (full color, monochrome, black/cyan, black/magenta)", "preferential paper feed tray (automatic sheet selection, tray 1, tray 2, tray 3, mass feed, manual feed (paper size, paper type))", "paper size (when the "preferential paper feed tray" is "manual feed)", "paper type" (when the "preferential paper feed tray" is "manual feed)", "preferential print form (default form)", "brightness (−50% to +50%)", "contrast (−50% to +50%)", "vividness (−50% to +50%)", "red balance (−50% to +50%)", "green balance (−50% to +50%)", and "blue balance (−50% to +50%)", as color printing adjustment.

When form data is selected in the "preferential print form", "file name (Yes, No)", "file date (Yes, No)", and "personal name (Yes, No)" are included therein.

The OCR setting includes, for example as shown in FIG. 18B, "direction of OCR recognition (automatic, horizontal writing, vertical writing, one column setting in horizontal writing, one column setting in vertical writing)", "language for OCR recognition (automatic, Japanese, English)", "document for OCR recognition (automatic, sentence, table)", and "largest character size for OCR recognition (6 pt to 65 pt (point: the unit of character size)".

Figure 19A:
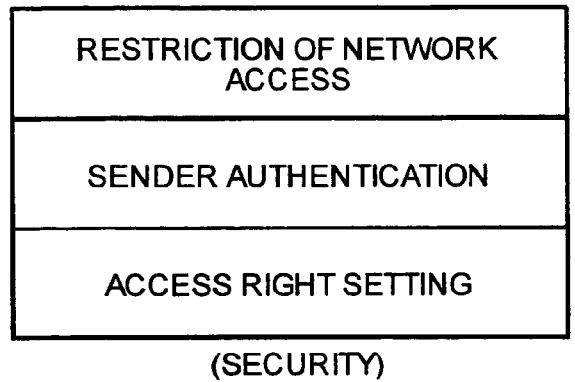
FIGS. 19A to 19D are schematic diagrams of one example of security, network access control, authentication for e-mail transmission, and access right control.

The security includes, for example as shown in FIG. 19A, restriction of network access, sender authentication, and access right setting.

Figure 19B:
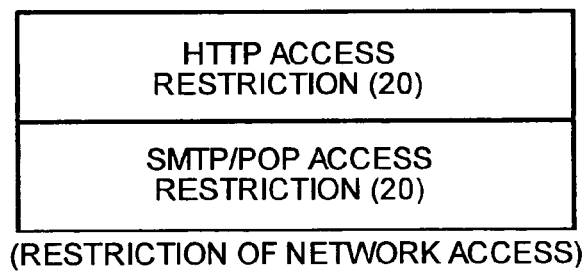

The "restriction of network access" includes, for example as shown in FIG. 19B, 20 "HTTP access restriction (Yes, setting of HTTP access restriction: IP address), No)", and 20 "SMTP/POP access restriction (Yes, setting of SMTP/POP access restriction), No).

When the contents of the "HTTP access restriction" and the "SMTP/POP access restriction" are respectively "No", administrator setting is applied to the "HTTP access restriction" and the "SMTP/POP access restriction".

Figure 19C:
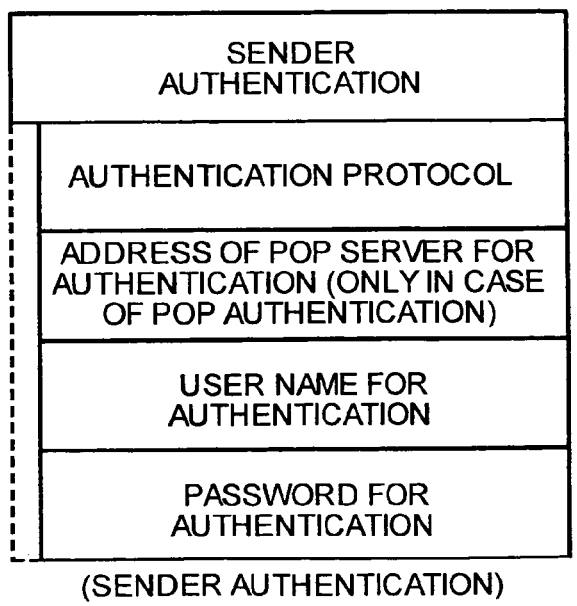

The "sender authentication" includes, for example as shown in FIG. 19C, "sender authentication (Yes, No) for specifying whether to set authentication information for each person, and when the "sender authentication" is set to "Yes", "authentication protocol, (SMTP authentication, POP authentication)", "authenticating server address (only in case of POP authentication)", "user name for authentication (user name at the time of SMTP/POP authentication)", and "password for authentication (password at the time of SMTP/POP authentication)" are included therein.

Figure 19D:
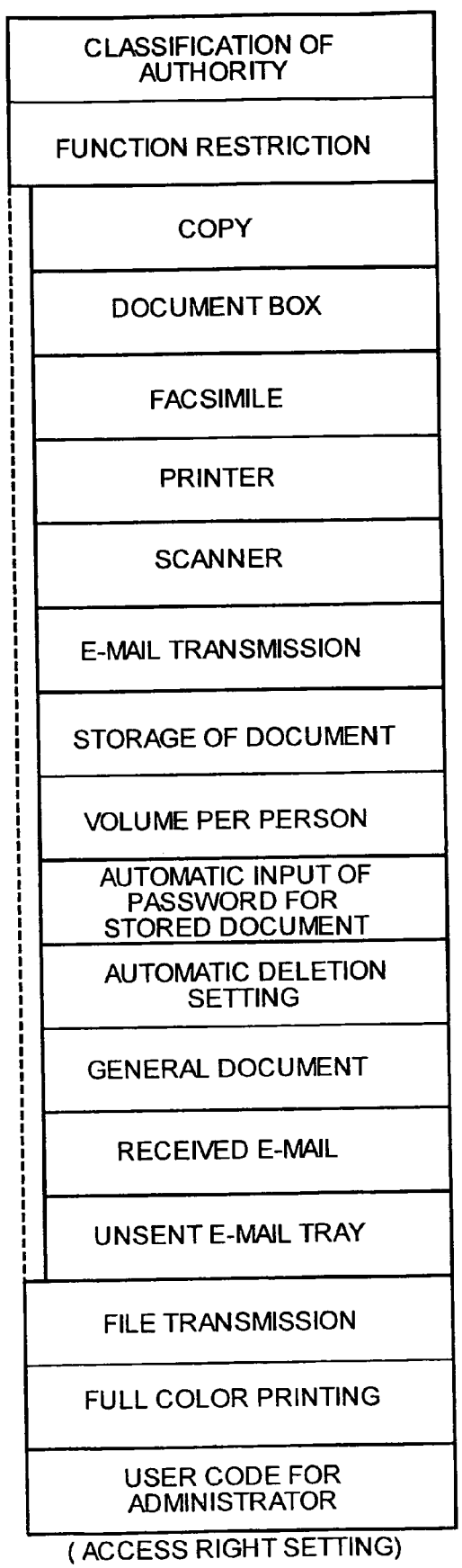

The "access right setting" includes, for example as shown in FIG. 19D, "classification of authority (administrator, general user)", "function restriction (Yes, No)", "file transmission (approve, disapprove)", "full color print (approve, disapprove)", and "user code for administrator".

When the "function restriction" is set to "Yes", "copy (approve, disapprove)", "document box (approve, disapprove)", "facsimile (approve, disapprove)", "printer (approve, disapprove)", "scanner (approve, disapprove)", "e-mail transmission", "storage of document", and "automatic deletion setting (approve, disapprove)".

When the "document box" is set to "approve", "volume per person (Yes (0.1 Gigabyte to 99.9 Gigabytes), No)" and "automatic input of password for stored document (Yes, No)" are included therein.

When the "automatic deletion setting" is set to "approve", "general document (Yes (storage period is from one day to 180 days), No)", "received e-mail (Yes (storage period is from one day to 180 days), No)", and "unsent e-mail tray (Yes (storage period is from one day to 180 days), No)" are included therein.

Figure 20A:
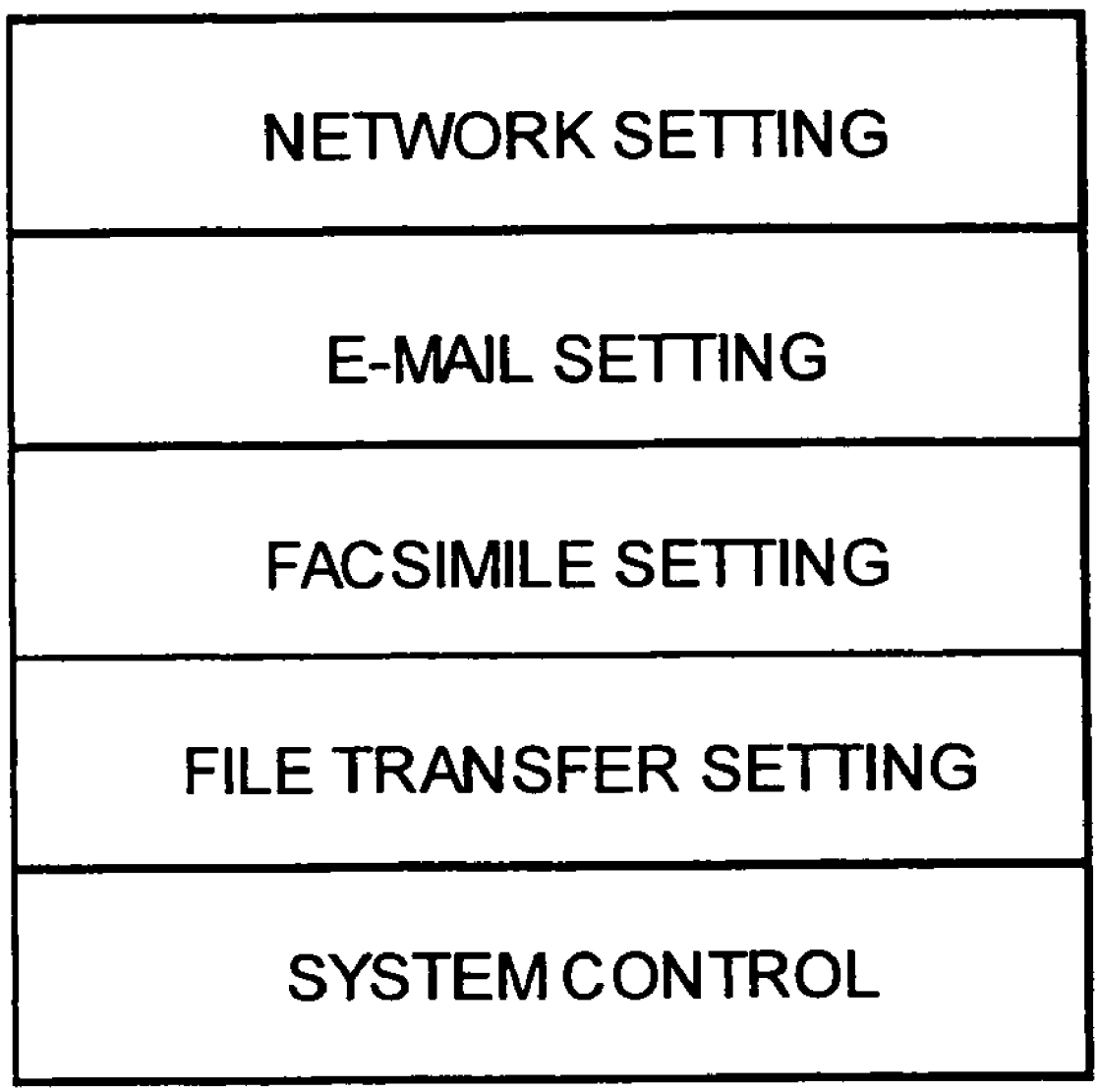

The system setting includes five categories, for example as shown in FIG. 20A, network setting, e-mail setting, facsimile setting, file transfer setting, and system control.

The network setting includes, for example as shown in FIGS. 20B and 20C, "host name", "domain name", "IP address", "subnet mask", "gateway address", "DNS server address 1 (IP address of a primary DNS server)", "DNS server address 2 (IP address of a secondary DNS server)", "proxy server setting (Yes, No)". "SSL encryption (Yes, No)", "port number setting (Yes, No)", "IP address of printer", "LAN (Ethernet) speed (automatic setting, 10 Megabits per seconds (Mbps) full duplex fixed, 100 Mbps full duplex fixed, 10 Mbps half duplex, 100 Mbps half duplex", and "physical address (medium access control (MAC) address)".

When the "proxy server setting" is set to "Yes", "proxy server address", "proxy server port number", "proxy unused address", "user name", and "password" are included therein.

When the "SSL encryption" is set to "Yes", "International Organization for Standardization (ISO) country code", "prefecture name", "city, ward, town, and village", "company name/organization name", "post name/organization name, section name", "server name (initial value is "host name")", "administrator's e-mail address", and "expiration date" are included therein.

When the "port number setting" is set to "Yes", "SMTP transmission (initial value is 25)", "SMTP reception (initial value is 25: 0 to 65535", "POP (initial value is 110: 0 to 65535)", "FTP (initial value is 21: 0 to 65535)", "HTTP (initial value is 80: 0 to 65535)", "hypertext transfer protocol security (HTTPS) (initial value is 443: 0 to 65535)", and "LDAP (initial value is 389: 0 to 65535)" are included therein.

When the port number of the "SMTP transmission" is set to "0", the SMTP transmission function cannot be used.

E-mail setting includes, for example as shown in FIGS. 21A and 21B, "IP address of SMTP server", "e-mail receiving protocol (SMTP, POP3, APOP)", "POP e-mail address", "POP server address", "POP account name", "POP password", "POP e-mail reception interval", "default destination of POP e-mail (received e-mail address of the guest setting)", "usage of public address book (Yes, No)", "sender authentication (Yes, No)", "restriction of transmission size (Yes, No)", "transmission interval (0 to 99 seconds)", "retransmission interval (1 to 99 minutes)", and "number of retransmission (0 to 99 times)".

When the "usage of public address book" is set to "Yes", "LDAP server address 1", "identification name", "LDAP server address 2", "identification name", and "automatic update of public address book (Yes (in the unit of 10 minutes), No)" are included therein.

When the "sender authentication" is set to "Yes", "authentication protocol (SMTP authentication, POP authentication)", "address of POP server for authentication", "user name for authentication", and "password for authentication" are included therein.

When the "restriction of transmission size" is set to "Yes", "maximum size (1 to 20 Megabytes)" and "split e-mail (Yes (number of splits: 2 to 99), No)" are included therein.

Figure 22A:
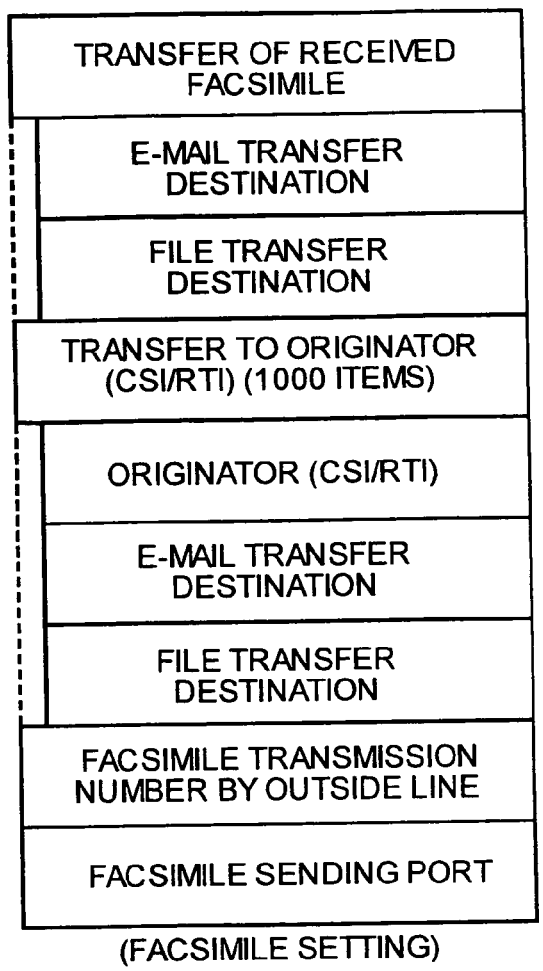
FIGS. 22A to 22B are schematic diagrams of one example of facsimile setting and file transfer setting.

The facsimile setting is applied to function setting of transfer allocation (mail/file transmission destination) at the time of reception. For example, the facsimile setting includes, as shown in FIG. 22A, "transfer of received facsimile (Yes, No)", and "transfer to originator (CSI/RTI) (Yes, No)" for 1000 items, "facsimile transmission number by outside line", and "facsimile sending port".

The content of the "transfer to originator (CSI/RTI)" for one item includes "originator (CSI/RTI)", "e-mail transfer destination (select from "e-mail/group address" and "registered users" in the guest setting)", and "file transfer destination (select from "file address" in the guest setting)".

Up to 100 items can be registered in the "e-mail transfer destination", and up to 4 items can be registered in the "file transfer destination".

Figure 22B:
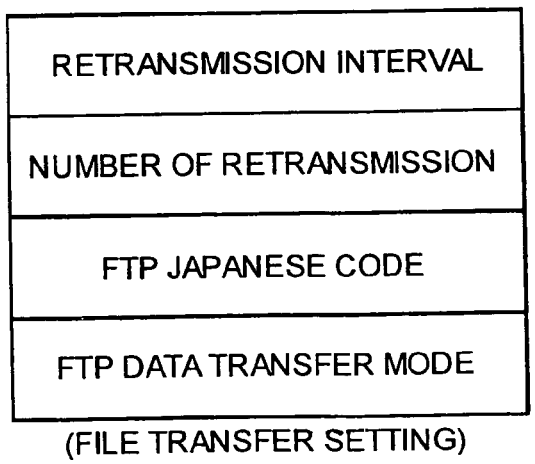

The file transfer setting includes, as shown in FIG. 22B, "retransmission interval (60 to 999 seconds)", "number of retransmission (0 to 999 times), "FTP Japanese code (shift JIS, EUC)", and "FTP data transfer mode (PORT mode, PASV mode)".

Figure 23A:
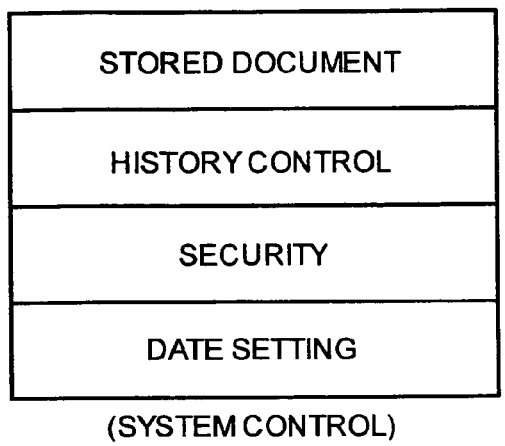
FIGS. 23A to 23E are schematic diagrams of one example of system management, stored documents, history management, security, and date setting.

The system control includes four categories, for example as shown in FIG. 23A, stored document, history control, security, and date setting.

Figure 23B:
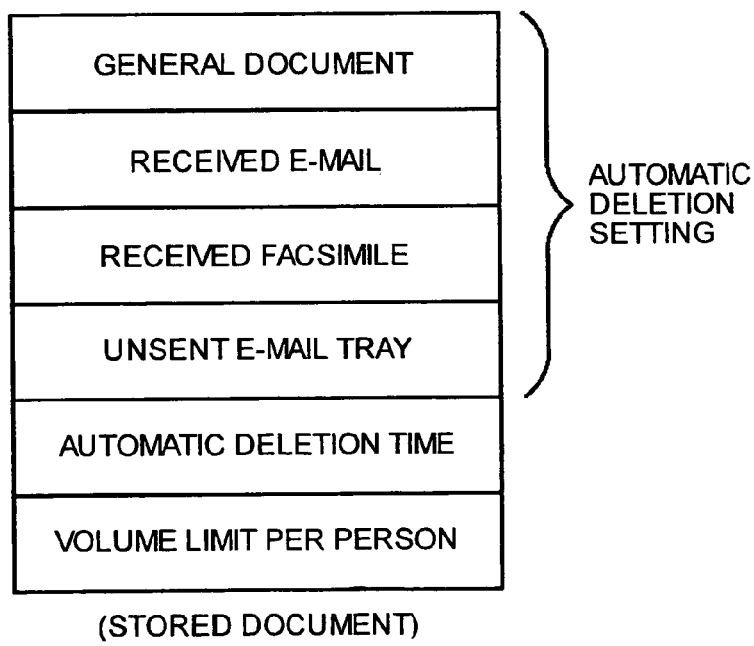

The stored document includes, for example as shown in FIG. 23B, "general document (Yes (storage period is from one day to 180 days), No)", "received e-mail (Yes (storage period is from one day to 180 days), No)", "received facsimile (Yes (storage period is from one day to 180 days), No)", and "unsent e-mail tray (Yes (storage period is from one day to 180 days), No)" relating to automatic deletion setting, "automatic deletion time (deletion time 0:00 to 23:50), and "volume limit per person (Yes (0.1 Gigabyte to 99.9 Gigabytes), No)".

Figure 23C:
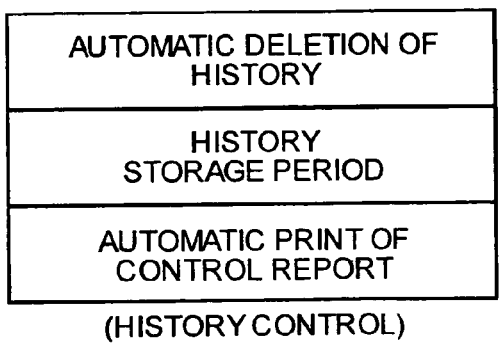

The history control includes, for example as shown in FIG. 23C, "automatic deletion of history (Yes (deletion time 0:00 to 23:50), No)", "history storage period (one day to 180 days)", and "automatic print of control report (Yes (print time 0:00 to 23:50), No)".

Figure 23D:
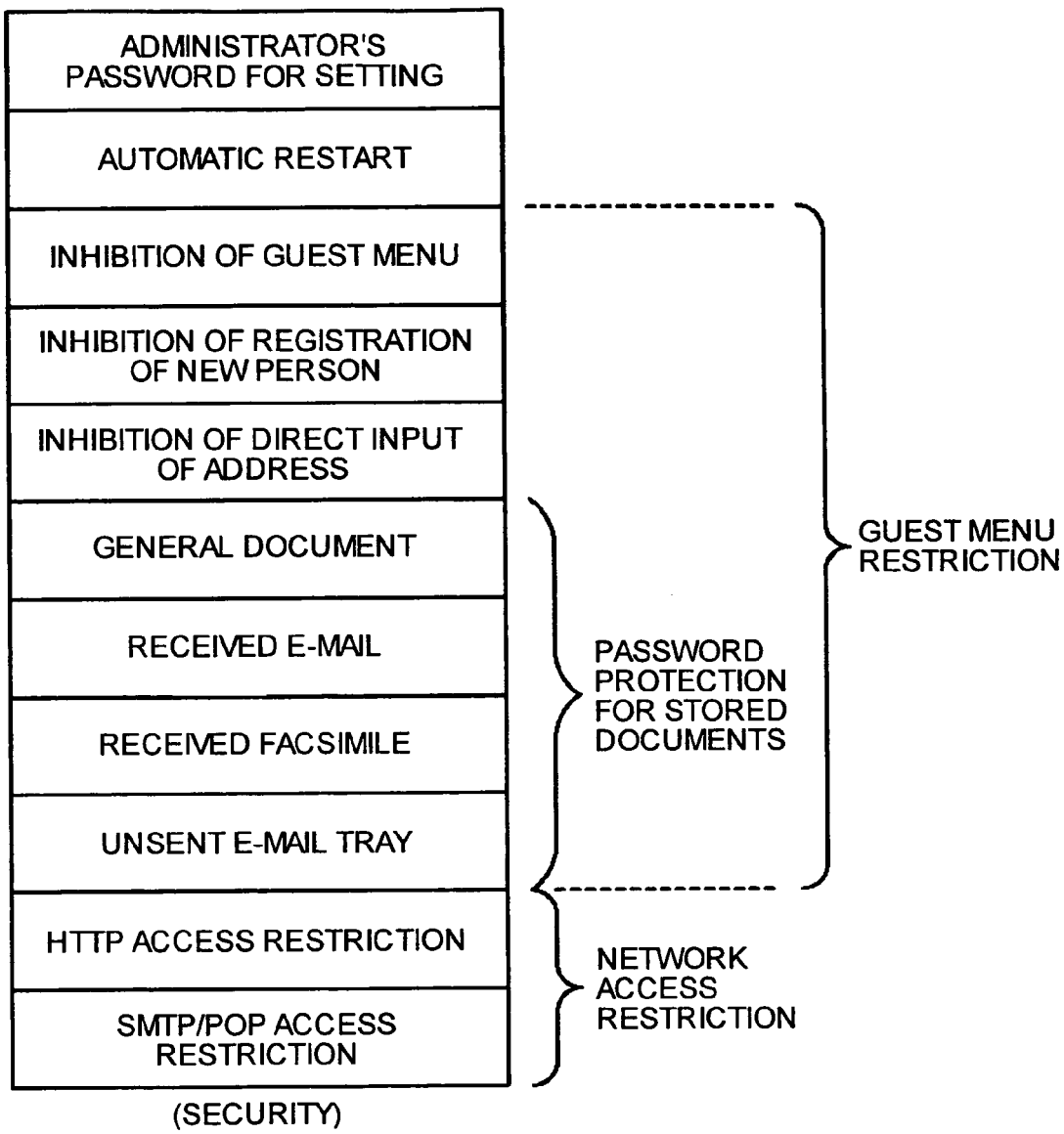

The security includes, for example as shown in FIG. 23D, "administrator's password for setting", "automatic restart (Yes (restart time 0:00 to 23:50), No)", and "inhibition of guest menu (Yes, No)", "inhibition of registration of new person (Yes, No)" and "inhibition of direct input of address (Yes, No)" relating to the guest menu restriction, "general document (Yes, No)", "received e-mail (Yes, No)", "received facsimile (Yes, No)", and "unsent e-mail tray (Yes, No)" relating to password protection for stored documents of the guests, and "HTTP access restriction (Yes (setting of HTTP access restriction), No)" and "SMTP/POP access restriction (Yes (setting of SMTP/POP access restriction), No)" relating to the network access restriction.

The password protection for stored documents of the guests is set such that when a user accesses the stored documents from the screen of the apparatus or from the Web browser, the user uses the administrator's password for setting, and the user name in the Web browser is an identification name of the guest setting.

Figure 23E:
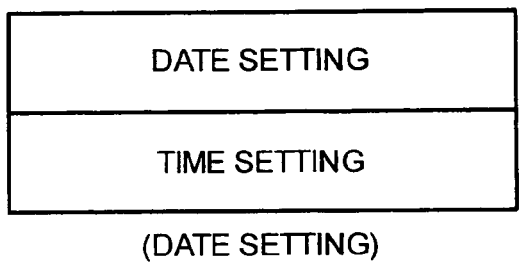

The date setting includes, for example as shown in FIG. 23E, "date setting (current time: 2003 to 2099, January to December, 1 to 31st", and "time setting (current time: 0 to 23 (hour), 0 to 59 (minutes), and 0 to 59 (seconds)".

In the case of communication requiring authentication, even if the URL of the file is e-mailed as the link information to the destination address, which is for example an address of another digital color multifunction product 1, the digital color multifunction product 1 cannot log in to a file server (such as the FTP server) to which the file is uploaded, and hence, cannot acquire the file.

To avoid this, the link information can include the user ID and the password to log in to the file server. It is not desirable in view of security, however, because the e-mail is transmitted without encryption.

In the embodiment, therefore, a confidential link is introduced to cope with such a problem.

Figure 24A:
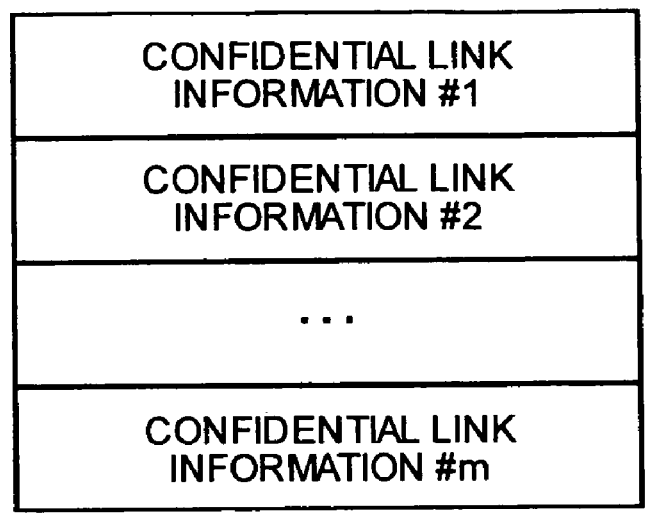
FIGS. 24A to 24B are schematic diagrams of one example of confidential link information table and confidential link information.
Figure 24B:
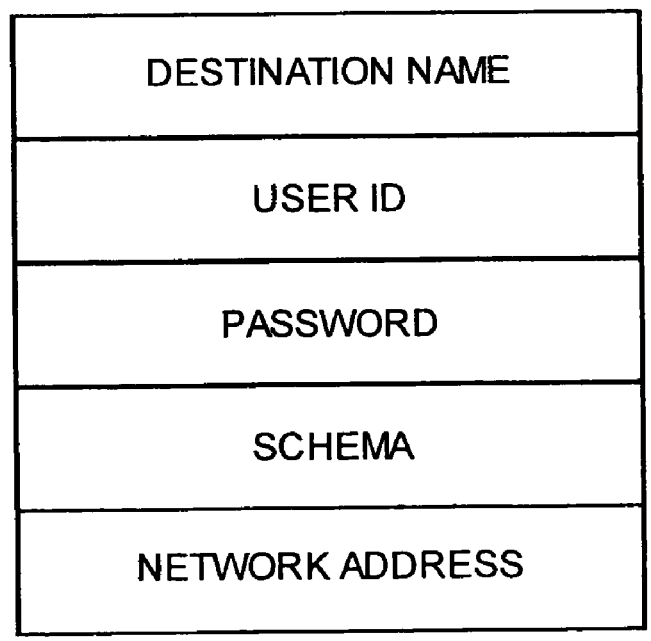

That is, the digital color multifunction product 1 includes a confidential link information table in which a plurality of confidential link information as shown in FIG. 24A is stored. Each piece of confidential link information includes, as shown in FIG. 24B, "destination name", "user ID", "password", "schema", and "network address".

The digital color multifunction products 1, which exchange data frequently, have common confidential link information. The digital color multifunction product 1 of a sender adds to the text of the e-mail, for example, "network address/file name" to specify the confidential link information and log in to the file server.

The digital color multifunction products 1 of a receiver searches the confidential link information table by using the "network address" included in the received e-mail as a key, to extract the relevant confidential link information.

The digital color multifunction products 1 of the receiver accesses to the file server using the "schema" and the "network address" registered in the confidential link information, and logs in to the file server by using the "user ID" and the "password" registered in the confidential link information if the file server requires authentication.

After log-in to the file server, the digital color multifunction products 1 of the receiver searches and obtains the file by the "file name" included in the e-mail.

According to the above configuration, when the digital color multifunction products 1 of the receiver cannot receive attached files for some reason, or when a mass file cannot be transmitted directly to the e-mail address due to a size restriction, only the URL of the file (not the file itself) is directly transmitted to the e-mail address by e-mail.

Figure 25A:
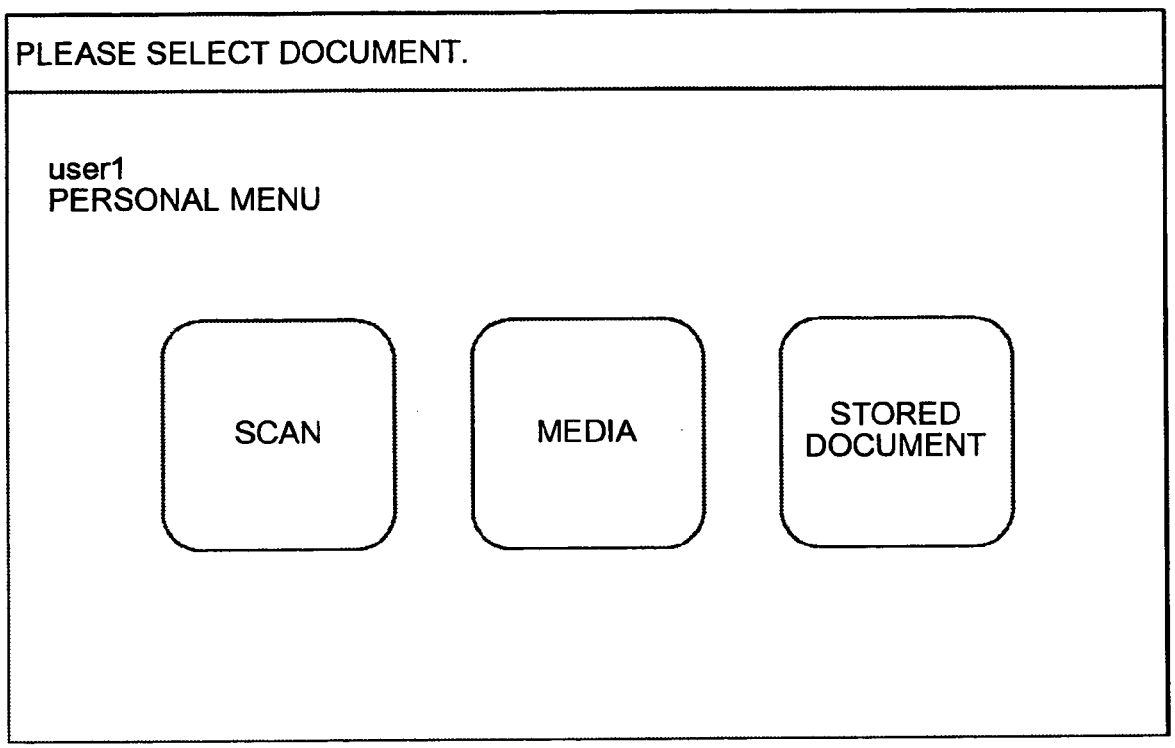
FIGS. 25A to 25B are schematic diagrams of one example of personal menu screen and stored document screen.
Figure 25B:
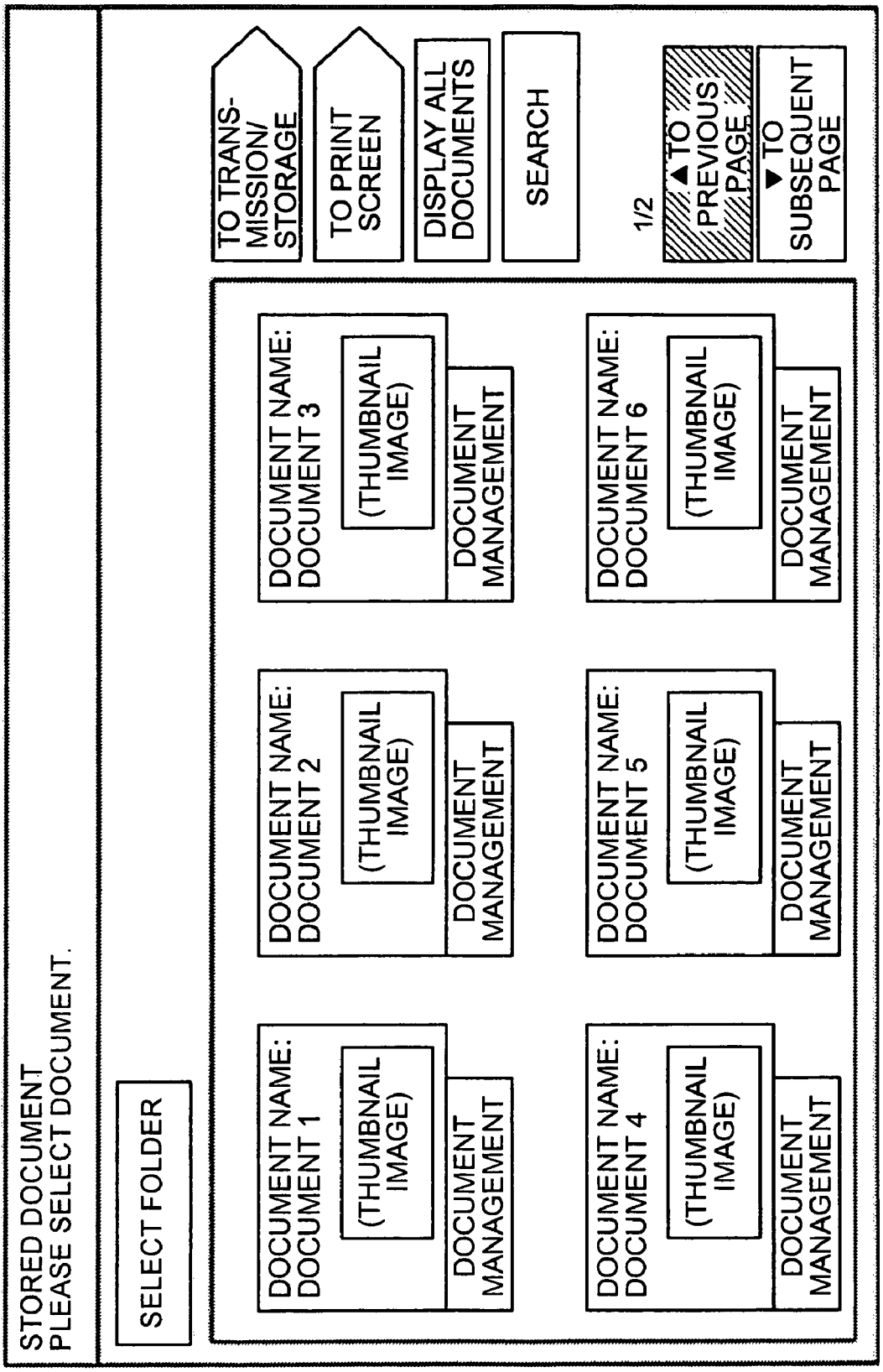

The user first logs in to the digital color multifunction product 1, and then, a personal menu screen as shown in FIG. 25A is displayed. When the user presses a button having a function of accessing stored documents (here, "stored documents"), a stored document screen as shown in FIG. 25B is displayed. The display mode of the stored document screen is according to the setting content of the main screen in the display setting of the personal system setting information of the personal setting.

On the display screen described in FIGS. 26A and 26B onward, hatched elements indicate that no selection is permitted, and elements enclosed by thick line indicate that the element is the selected one.

To specify a transmission document, when the user presses a thumbnail on the displayed first page, as shown in FIG. 26A, a screen appears on which only the thumbnail of the selected transmission document is displayed. When the selection of the transmission document finishes, the user presses a "to transmission/storage" button at the upper right on the screen. Accordingly, an e-mail address selection screen is displayed as shown in FIG. 26B. Respective items of the e-mail address displayed on the e-mail address selection screen are basically items registered in the e-mail address in the registration information in the personal setting.

A "planning department" is selected in order to set the content in the "To" field. When selection of the destination finishes, the user presses the "OK" button, and as a result, as shown in FIG. 27A, a screen for selecting a reply address is displayed. A "service department" here is selected as the reply address. Respective items of personal reply address displayed on the reply address selection screen are basically the items registered in the e-mail address in the registration information in the personal setting.

When selection of the reply address finishes, the user presses the "OK" button, and as a result, as shown in FIG. 27B, a screen for selecting a "subject" is displayed. Respective items of the registered subjects on the "subject" selection screen are basically the items registered in the subject/text in the registration information in the personal setting.

Other than the items in the list display, "direct input" is also possible. When the "direct input" is specified, an input screen for a keyboard is separately opened, so that optional character string can be input.

Figure 28:
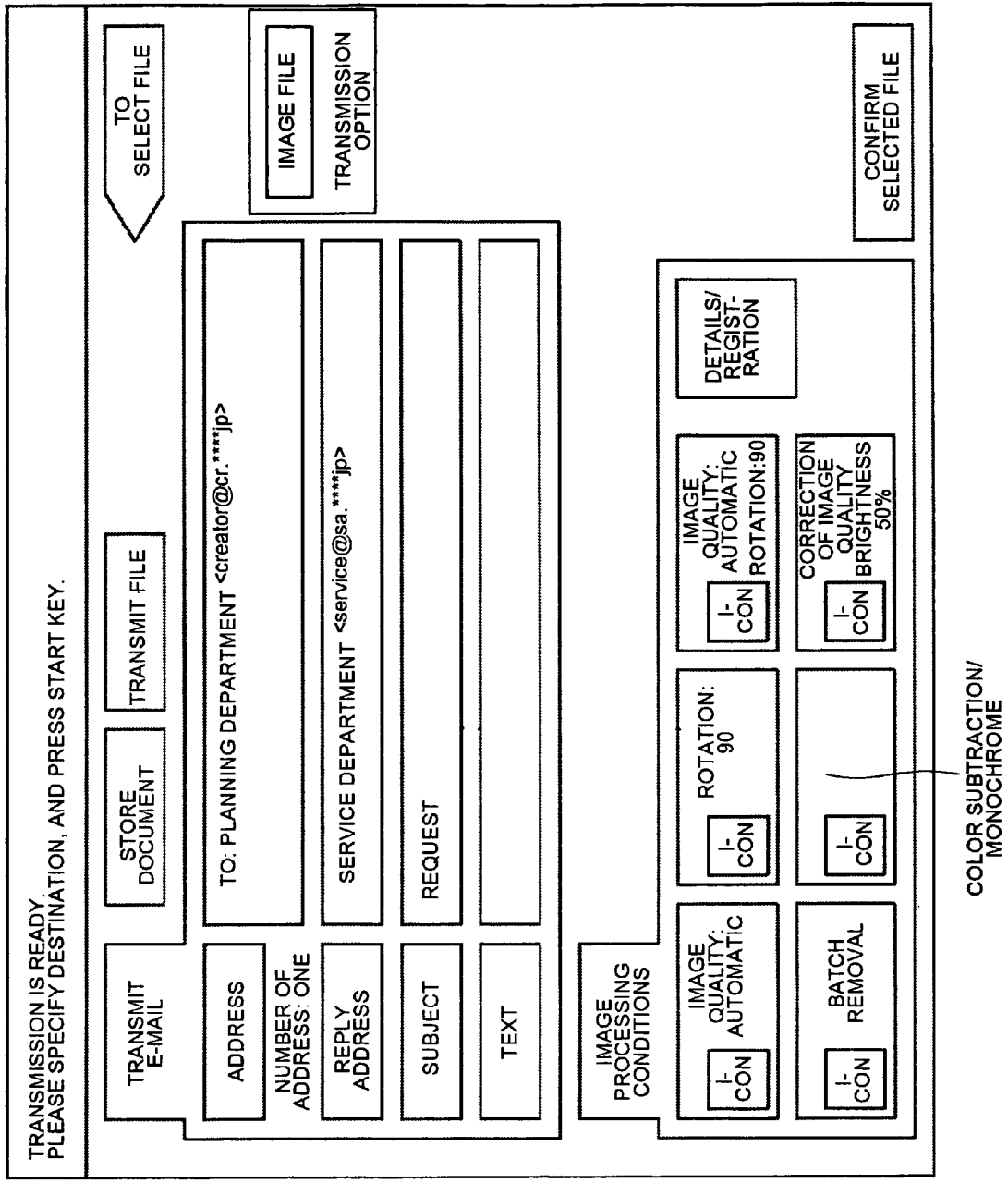
FIG. 28 is a schematic diagram of one example of operation screen after having set the address, reply address, and subject.

When input of the subject finishes, the user presses an "OK" button, and as a result, as shown in FIG. 28, a screen for allowing selection of a transmission option and the like is displayed. In this case, to set the "file transmission link", the user presses "transmission option" displayed at the right on the screen.

Accordingly, a subwindow as shown in FIG. 29A is displayed in a popup window on the display screen shown in FIG. 28. This is the initial state of a screen display for the transmission option, and "link format", "file transmission link address", and "thumbnail transmission" become selectable by selecting "Yes" in the "link transmission".

When the user selects "transmission link" in the "link format" item, and selects "change" in the "file transmission link address" item, a subwindow as shown in FIG. 29B is displayed for selecting the content of the file transmission link address. If the user selects "information disclosure" and presses the "OK" button, the display screen is updated as shown in FIG. 30, and the contents of the screen is used as conditions of the e-mail transmission. When the user presses the "OK" button in the screen, the subwindow for transmission option disappears, and only the screen shown in FIG. 28 remains to be displayed.

In this state, when the user presses the start key on the keyboard 41b, the digital color multifunction product 1 first creates a name of subfolder to which the file is uploaded. The subfolder name is created such that file names do not conflict with each other when many files are uploaded to the same file server. For example, the subfolder name is created by sequentially connecting a first character string indicating a host name, a second character string indicating a MAC address of the local area network controller 33, and a third character string indicating the date when the file is uploaded.

The digital color multifunction product 1 then logs in to the file server, which is specified in advance, to create the subfolder and upload the file therein.

Furthermore, the digital color multifunction product 1 sets the header of the e-mail with the destination, the subject, and the reply address, sets the text of the e-mail with the URL of the file uploaded to the file server, and transmits the created e-mail.

Figure 31:
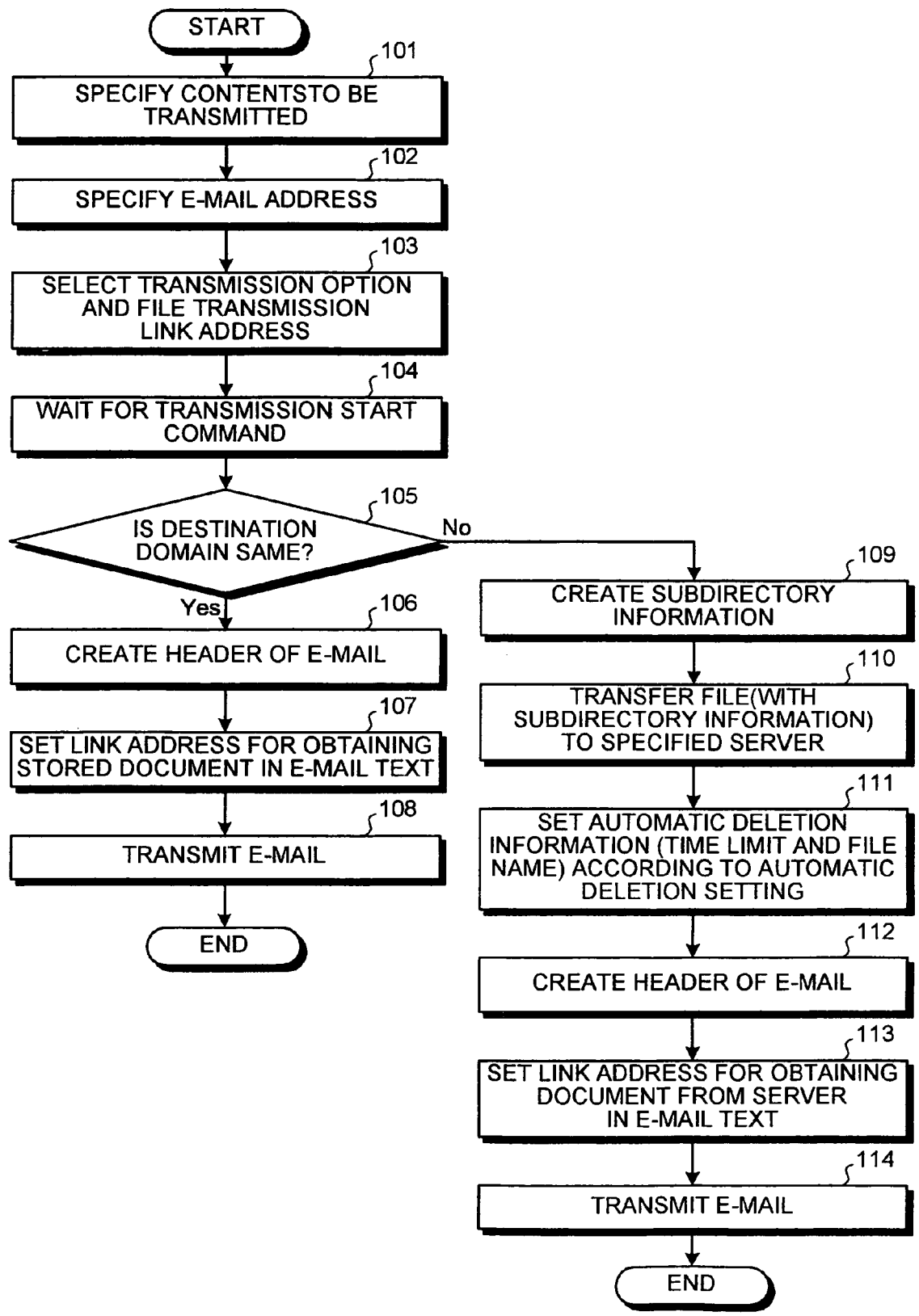
FIG. 31 is a flowchart of one example of processing at the time of transmitting file transmission link.

FIG. 31 is one example of processing when the file transmission link is transmitted. Each processing is performed by the units shown in FIG. 3, such as the CPU 31, the local area network controller 33, the display control unit 36, the operation input control unit 37, the control panel interface 38, the display unit 40 and the operation input unit 41.

At first, the user specifies contents to be transmitted (i.e. file) (processing 101), specifies an e-mail address (processing 102), and selects a transmission option and a file transmission link address (processing 103). After that, the digital color multifunction product 1 waits until transmission start is instructed (processing 104).

When the transmission start is instructed, the digital color multifunction product 1 checks the destination address and judge whether it is in the same domain as the own terminal (judgment 105). Then the digital color multifunction product 1 transmits the storage link when the result of judgment 105 shows Yes.

That is, the digital color multifunction product 1 creates header of the e-mail including the specified destination, the subject, and the reply address (processing 106), and also creates text of the e-mail including the URL (link address information) necessary to obtain the stored document file, which is provided by a FTP server or a HTTP server of the own terminal (processing 107).

The digital color multifunction product 1 then transmits the e-mail created at processing 106 and 107 (processing 108), and finishes the operation.

On the other hand, when the result of judgment 105 shows No, the digital color multifunction product 1 creates subdirectory information (subfolder name) for uploading the document file to the FTP server by using the above creation method (processing 109). The digital color multifunction product 1 then logs in to the FTP server specified in advance to create a subfolder, and uploads the file thereto (processing 110).

The digital color multifunction product 1 also creates automatic deletion information for automatically deleting the uploaded file according to the content of the automatic deletion setting, and stores the information in the file server (processing 111).

The digital color multifunction product 1 then creates header of the e-mail in which the specified destination, the subject, and the reply address (processing 112), and also creates text of the e-mail including the URL necessary to obtain the file uploaded to the FTP server (processing 113).

The digital color multifunction product 1 transmits the e-mail created at processing 112 and 113 (processing 114), to finish the operation.

According to the present invention, the file to be delivered to a specific destination is uploaded to the file server, and a Uniform Resource Identifier (URI) of the uploaded file is notified to the destination by e-mail. Accordingly, there is the effect that the type and size of the file are not restricted, as compared with a case that a file is directly transmitted by e-mail.

Furthermore, when the file is uploaded to the file server, a subfolder for storing the file is created in the storage area of the file server, and the name of the subfolder is created to be a unique value in the file server. Accordingly, conflict of filenames in the file server can be prevented.

Furthermore, the creation process of the subfolder name is simple because the subfolder name is created by sequentially connecting a predetermined prefix, a physical address of the communication interface of the network multifunction product, and date when the file is uploaded to the file server.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A network communication system comprising a file server, a source computer, and a destination computer, wherein the source computer is a network multifunction product, comprising:
    a scanner configured to create a digital image by optically scanning a surface of a document;
    an uploading unit configured to upload a file including the digital image to the file server;
    a URI sending unit configured to send a Universal Resource Identifier (URI) of the file to the destination computer by e-mail;
    a transmitter configured to attach the file to an e-mail and send the e-mail including the attached file to the destination computer; and
    an interface configured to accept a selection of whether to send the e-mail including the attached file or the URI of the file to the destination computer.

2. The network communication system according to claim 1, wherein the source computer further includes a folder creating unit configured to create a folder to store the file on the file server.

3. The network communication system according to claim 2, wherein a name of the folder is a combination of a predetermined prefix, a physical address of the source computer, and date when the file is uploaded to the file server.

4. The network communication system according to claim 1, wherein the URI sent to the destination computer is not a URI corresponding to a location to which the file is uploaded by the uploading unit.

5. The network communication system according to claim 1, wherein the destination computer is a network multifunction product and comprises:
    a table configured to hold security information that is required to access the file;
    a URI receiving unit configured to receive the URI; and
    a downloading unit configured to download the file from the file server using the security information corresponding to the URI.

6. The network communication system according to claim 5, wherein the security information includes a user ID and a password.

7. The network communication system according to claim 1, wherein
    the source computer further includes a storage period sending unit configured to send a storage period, which is a period for which the file is to be stored, to the file server, and
    the file server is configured to delete the file when the storage period of the file has expired.

8. A network multifunction product that is connected to a file server in a network communication system, comprising:
    a scanner configured to create a digital image by optically scanning a surface of a document;
    an uploading unit configured to upload a file including the digital image to the file server;
    a URI sending unit configured to send a Universal Resource Identifier (URI) of the file to a destination computer by e-mail;
    a transmitter configured to attach the file to an e-mail and send the e-mail including the attached file to the destination computer, and
    an interface configured to accept a selection of whether to send the e-mail including the attached file or the URI of the file to the destination computer.

9. The network multifunction product according to claim 8, further comprising:
   a folder creating unit configured to create a folder to store the file on the file server.

10. The network multifunction product according to claim 9, wherein a name of the folder is a combination of a predetermined prefix, a physical address of the source computer, and date when the file is uploaded to the file server.

11. The network multifunction product according to claim 8, further comprising:
   a table configured to hold security information that is required to access to the file;
   a URI receiving unit configured to receive the URI; and
   a downloading unit configured to download the file from the file server using the security information that corresponds to the URI.

12. The network multifunction product according to claim 11, wherein the security information includes a user ID and a password.

13. The network multifunction product according to claim 8, further comprising:
   a storage period sending unit configured to send a storage period, which is a period for which the file is to be stored, to the file server, wherein
   the file server is configured to delete the file when the storage period of the file has expired.

14. The network communication system according to claim 1, wherein the interface is configured to display a screen allowing for selection of whether to attach the file including the digital image to an e-mail and send the e-mail attached with the file or to send only the URI of the file via e-mail, and to accept the selection via the screen presented at the interface.

15. The network multifunction product according to claim 8, wherein the interface is configured to display a screen allowing for selection of whether to attach the file including the digital image to an e-mail and send the e-mail attached with the file or to send only the URI of the file via e-mail, and to accept the selection via the screen presented at the interface.

* * * * *